US012627691B2

(12) United States Patent
Bajpai et al.

(10) Patent No.: US 12,627,691 B2
(45) Date of Patent: *May 12, 2026

(54) AUTOMATED DETECTION OF COMPUTING SYSTEM AND NETWORK ACTIVITY ANOMALIES USING DENOISING DIFFUSION PROBABILISTIC MODELS

(71) Applicant: MOTOROLA SOLUTIONS, INC., Chicago, IL (US)

(72) Inventors: Pranshu Bajpai, Chicago, IL (US); Eamon Bracht, La Grange, IL (US); Cyril Jazra, Champaign, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/647,463

(22) Filed: Apr. 26, 2024

(65) Prior Publication Data

US 2024/0275806 A1    Aug. 15, 2024

Related U.S. Application Data

(63) Continuation-in-part of application No. 17/530,255, filed on Nov. 18, 2021, now Pat. No. 12,015,624.

(51) Int. Cl.
*H04L 9/40* (2022.01)

(52) U.S. Cl.
CPC ................................ *H04L 63/1425* (2013.01)

(58) Field of Classification Search
CPC ... H04L 63/1425; H04L 63/1416; G06N 3/08; G06N 3/088; G06N 7/01; G06F 18/214
See application file for complete search history.

(56) References Cited

U.S. PATENT DOCUMENTS 9,088,598 B1 * 7/2015 Zhang ................. H04L 63/1408
9,367,683 B2 6/2016 Kolacinski et al.
(Continued)

OTHER PUBLICATIONS

Zhang, C. et al., "Zipnet-gan: Inferring fine-grained mobile traffic patterns via a generative adversarial neural network," Proceedings of the 13th International Conference on emerging Networking Experiments and Technologies, ACM (2017).
(Continued)

*Primary Examiner* — Thaddeus J Plecha
(74) *Attorney, Agent, or Firm* — Michael Best & Friedrich LLP

(57) ABSTRACT

Systems and methods for detecting security anomalies in a computing environment. One example system includes an electronic processor configured to receive, via the communication interface, security data for the computing environment and parse the security data to extract a feature set. The electronic processor is configured to apply noise to the feature set to produce a noised feature set and to produce a reduced noise feature set by processing the noised feature set using a neural network trained to remove noise. The electronic processor is configured to compare the reduced noise feature set to the feature set to determine a success score, select a threshold based on the security data, and determine whether the success score exceeds the threshold. The electronic processor is configured to, responsive to determining that the success score does not exceed the threshold, generate a security event based on the security data.

20 Claims, 11 Drawing Sheets

(56) References Cited

U.S. PATENT DOCUMENTS

| | | | |
|---|---|---|---|
| 10,956,808 B1 | 3/2021 | Bhardwaj et al. | |
| 12,015,624 B2 * | 6/2024 | Bracht | G06F 18/214 |
| 2018/0234302 A1 | 8/2018 | James et al. | |
| 2018/0302423 A1 | 10/2018 | Muddu et al. | |
| 2019/0098034 A1 | 3/2019 | Wakasugi et al. | |
| 2020/0387797 A1 | 12/2020 | Ryan et al. | |
| 2021/0049452 A1 | 2/2021 | Fan et al. | |
| 2022/0300791 A1 * | 9/2022 | DeLaRosa | G06F 17/11 |
| 2022/0351001 A1 * | 11/2022 | Bhuyan | G06N 3/08 |

OTHER PUBLICATIONS

Sohl-Dickenstein et al., "Deep Unsupervised Learning using Nonequilibrium Thermodynamics," (2015) arXiv:1503.03585.
Dhariwal et al., "Diffusion Models Beat GANs on Image Synthesis," (2021) arXiv:2105.05233.
Ho et al., "Denoising Diffusion Probabilistic Models," (2020) arXiv:2006.11239.

* cited by examiner

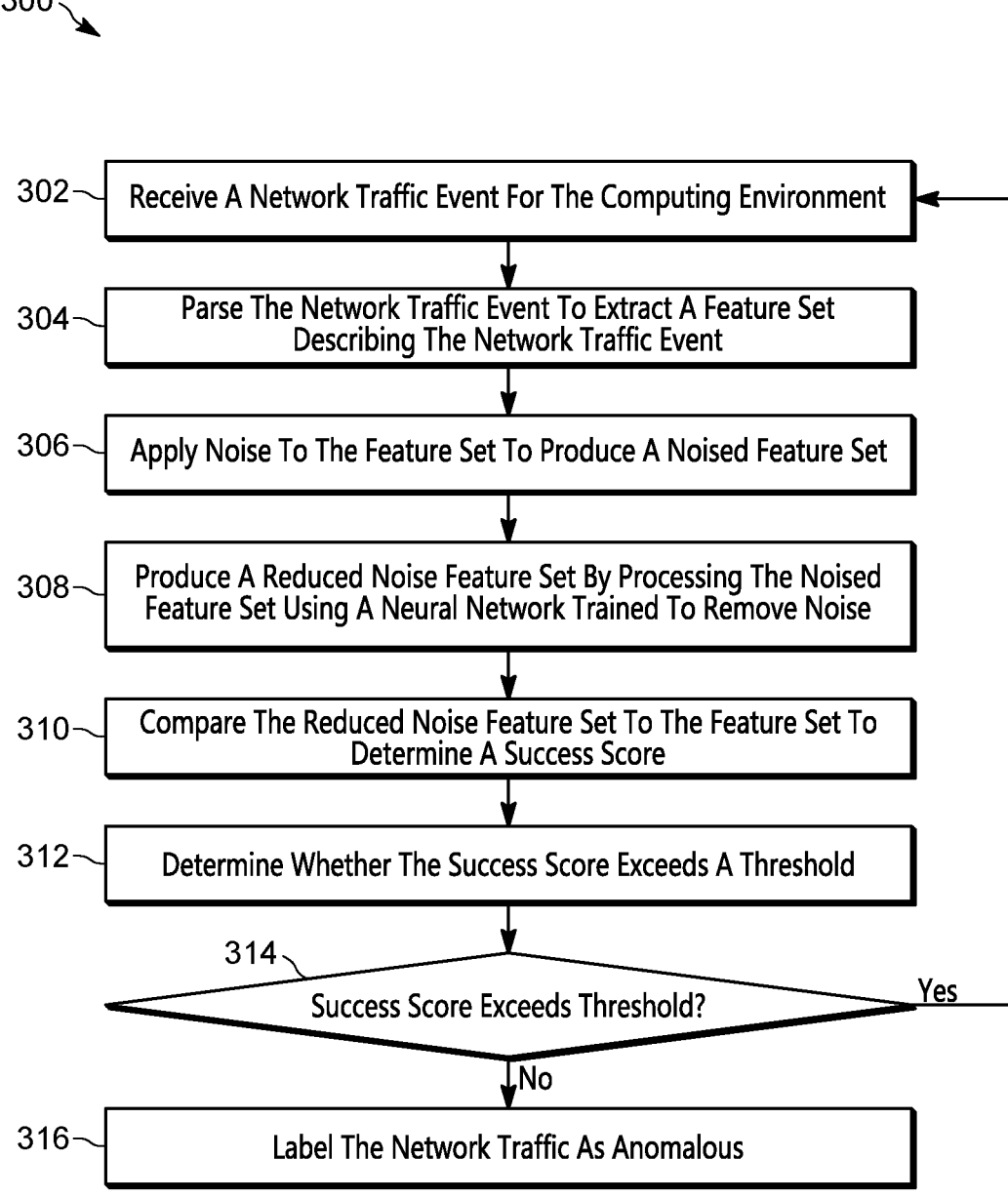

300

302 — Receive A Network Traffic Event For The Computing Environment

304 — Parse The Network Traffic Event To Extract A Feature Set Describing The Network Traffic Event 306 — Apply Noise To The Feature Set To Produce A Noised Feature Set 308 — Produce A Reduced Noise Feature Set By Processing The Noised Feature Set Using A Neural Network Trained To Remove Noise 310 — Compare The Reduced Noise Feature Set To The Feature Set To Determine A Success Score 312 — Determine Whether The Success Score Exceeds A Threshold 314 — Success Score Exceeds Threshold?

Yes

No

316 — Label The Network Traffic As Anomalous

FIG. 3

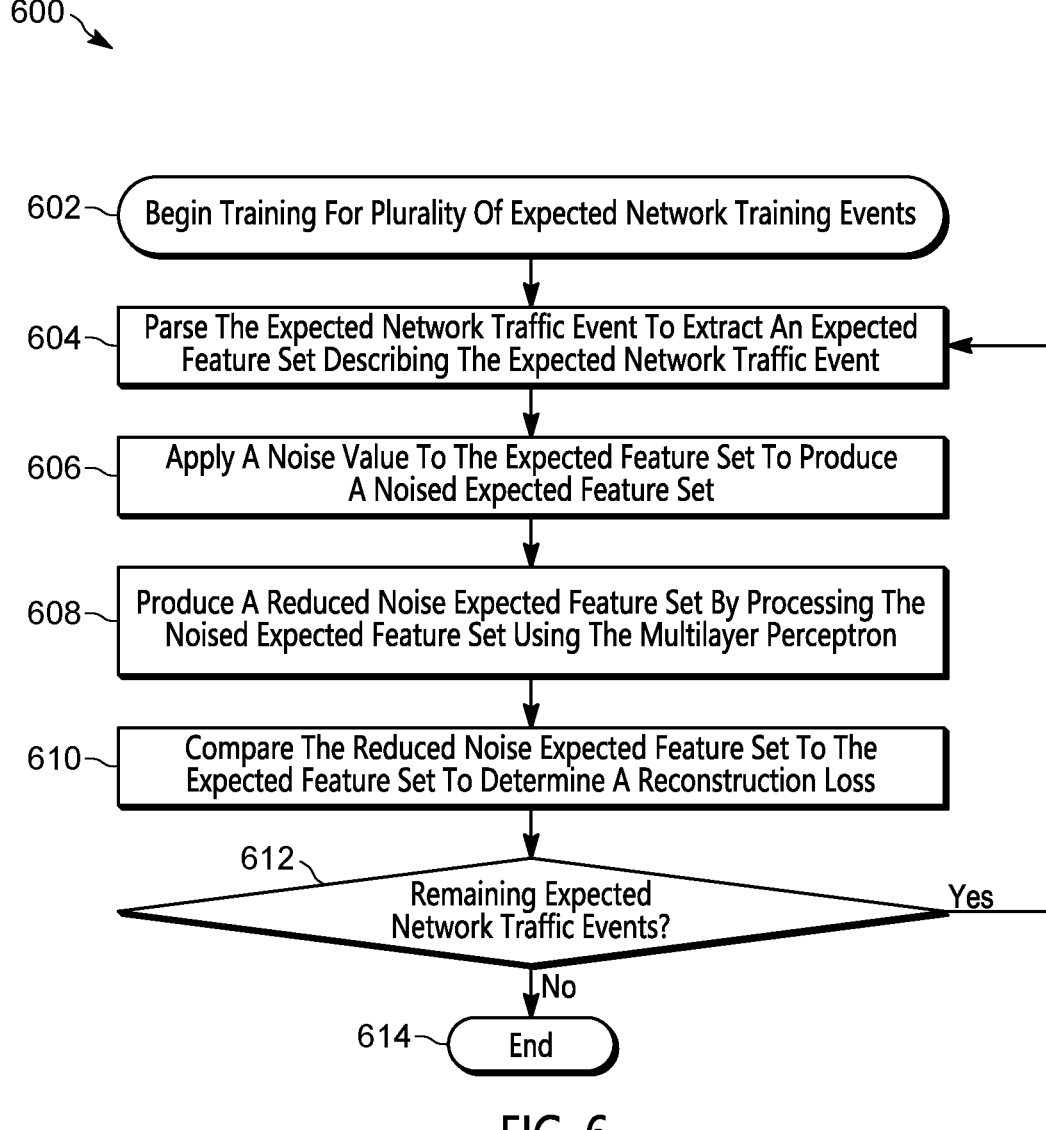

600

602 — Begin Training For Plurality Of Expected Network Training Events

604 — Parse The Expected Network Traffic Event To Extract An Expected Feature Set Describing The Expected Network Traffic Event 606 — Apply A Noise Value To The Expected Feature Set To Produce A Noised Expected Feature Set 608 — Produce A Reduced Noise Expected Feature Set By Processing The Noised Expected Feature Set Using The Multilayer Perceptron 610 — Compare The Reduced Noise Expected Feature Set To The Expected Feature Set To Determine A Reconstruction Loss 612 — Remaining Expected Network Traffic Events?    Yes No 614 — End

FIG. 6

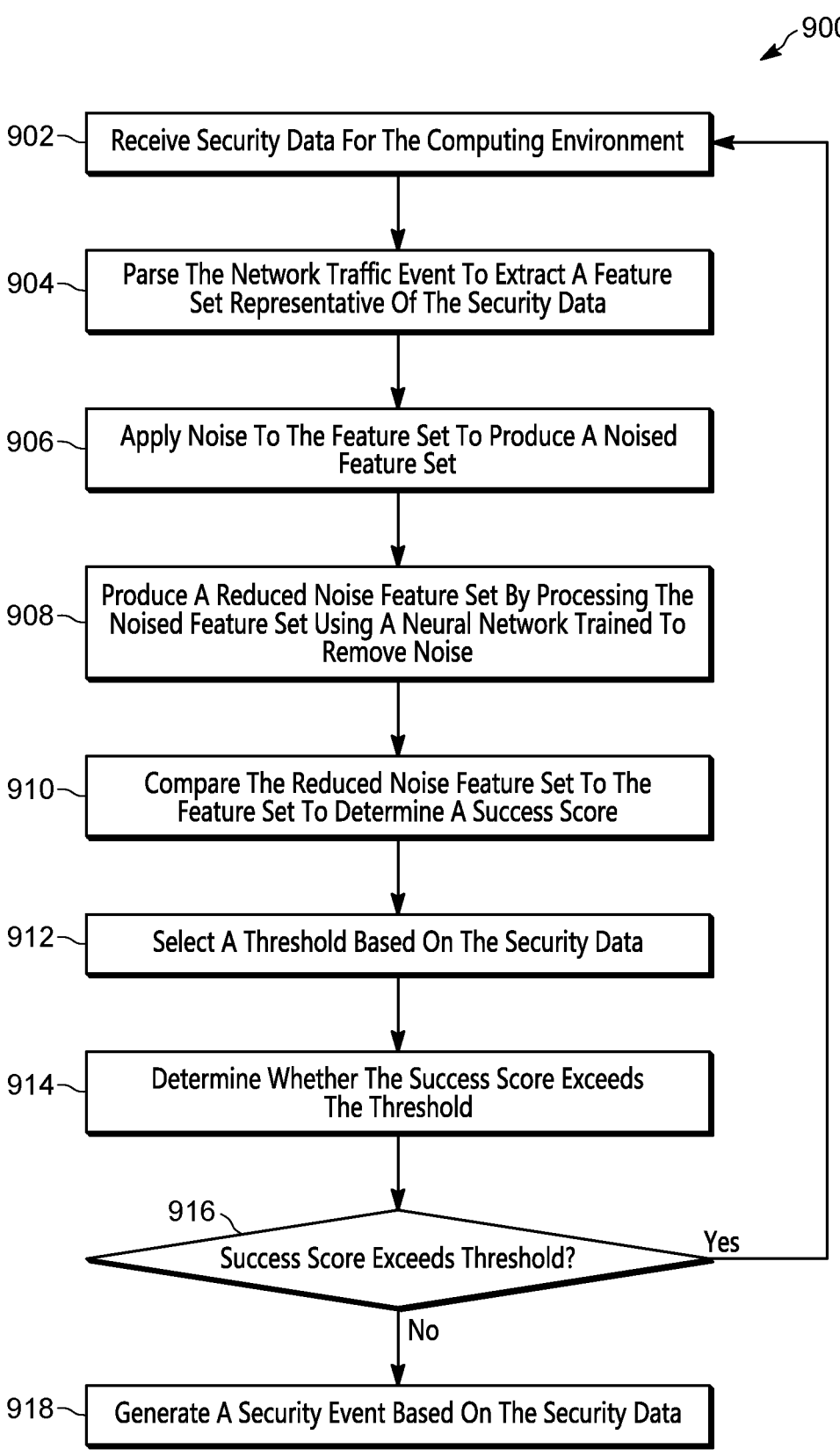

902 — Receive Security Data For The Computing Environment

904 — Parse The Network Traffic Event To Extract A Feature Set Representative Of The Security Data 906 — Apply Noise To The Feature Set To Produce A Noised Feature Set 908 — Produce A Reduced Noise Feature Set By Processing The Noised Feature Set Using A Neural Network Trained To Remove Noise 910 — Compare The Reduced Noise Feature Set To The Feature Set To Determine A Success Score 912 — Select A Threshold Based On The Security Data 914 — Determine Whether The Success Score Exceeds The Threshold 916 — Success Score Exceeds Threshold?

Yes

No

918 — Generate A Security Event Based On The Security Data

FIG. 9

AUTOMATED DETECTION OF COMPUTING SYSTEM AND NETWORK ACTIVITY ANOMALIES USING DENOISING DIFFUSION PROBABILISTIC MODELS

CROSS-REFERENCE TO RELATED APPLICATIONS

The present application is a continuation-in-part of the co-pending U.S. patent application Ser. No. 17/530,255, filed Nov. 18, 2021, titled "Automated Detection of Computing System and Network Activity Anomalies Using Denoising Diffusion Probabilistic Models."

BACKGROUND OF THE INVENTION

Public safety agencies and corporate enterprises increasingly rely on network and software systems infrastructure. Officers and other employees use, among other things, mobile electronic devices to remotely access mission critical software applications and other services. Remote access capability is necessary for the agencies and enterprises to effectively operate. However, opening a network to remote access can open the network to potential misuse by malicious parties. Such misuse can result in data breaches, communications breakdowns, reduced system performance, and other problems. Consequently, network and software systems infrastructure are secured by using, for example, access control policies, encryption, firewalls, network segmentation, anti-virus software, and the like. In addition, Intrusion detection systems (IDS) are vital for protecting public safety and corporate infrastructure.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 3 is a flowchart of a method for detecting security anomalies in a computing environment, according to some examples.

FIG. 6 is a flowchart of a method for training a neural network executed by the system of FIG. 1 in accordance with some embodiments.

FIG. 9 is a flowchart of a method for detecting anomalies in a computing environment, according to some examples.

Figure 1:
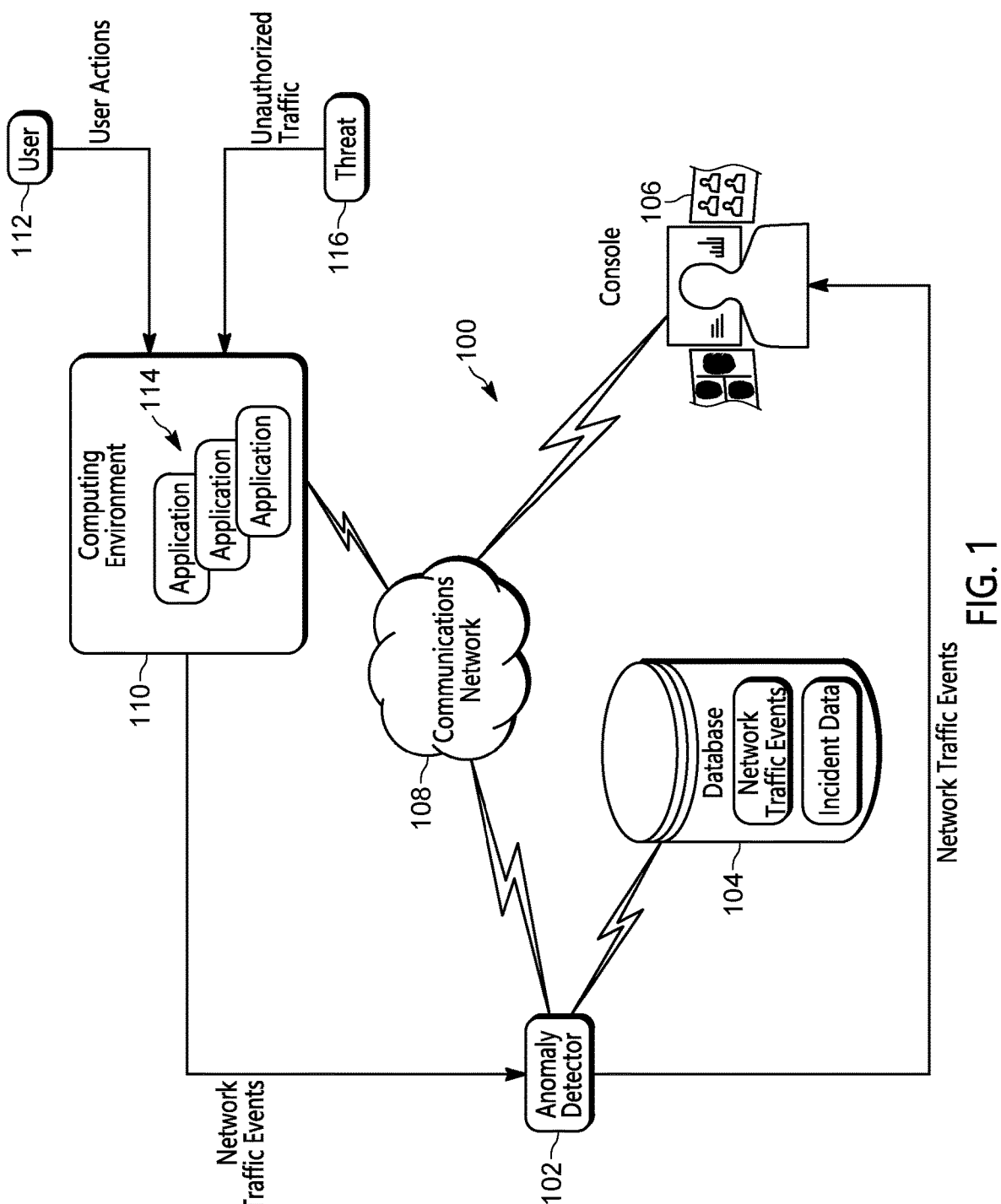
FIG. 1 is a block diagram of a network security anomaly detection system, according to some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Complex computing environments are vital tools used by public safety agencies and other public and private sector entities. For example, a police department may use software and other computing technology to, among other things, plan its patrol and other operations, provide communications to first responders and other personnel, receive incident reports from the public, dispatch and coordinate incident response, perform incident investigation, catalog evidence and other records, provide video security and access control systems, and evaluate agency effectiveness. Corporate entities similarly rely on network and computing infrastructure to perform or aid in the performance of many or all aspects of their business operations.

Such computing environments, including cloud-based computing environments, interconnect a myriad of stationary and portable computing devices to provide software applications and other services to personnel operating remotely. For example, in a public safety agency, each employee may carry and operate at least one portable computing device, such as a smart phone, which authenticates to the computing environment to provide its user with access, applications, and services. Each of these devices connects with and exchanges data with numerous other devices and services within the computing environment. Large amounts of network traffic and data are generated through these interactions.

To secure these computing environments, operating entities use security operation centers (SOCs) to monitor the operations of the computing environments. However, it is impractical, if not impossible, for human SOC analysts to evaluate the millions of network traffic events generated by the complex computing environments used to support government and corporate entities. As a result, SOCs use a mixture of manual and automated monitoring of the computing environments. Automated monitoring includes the use of intrusion detection systems (IDSs) to analyze network traffic and data to detect security events that represent a threat to the computing environment.

One current approach is to use a rule-based detection system, which compares network traffic to a set of rules. Network traffic that does not follow the set of rules is flagged as a security event. Rules-based approaches require network operators to program each specific security rule individually. This requires a lot of effort to implement, results in a bloated code base, and can lead to cascading dependencies when rules break. Rules-based systems can generate an unmanageable number of false positives (that is, alerts that require attention but are not actual security threats), leading to alert fatigue for security analysts. Rules-based systems can also generate a large volume of false negatives (that is, security events that go by undetected because they are not accounted for in a rule). False negatives result in threats causing damage to systems before they are detected.

Context for a flagged security event allows for prioritizing events to efficiently deploy resources and aids security analysts in their investigation of the event. However, rule-based systems may not provide an evaluation of how likely it is that a flagged event is a security anomaly, or reasoning for why an event is flagged beyond the fact that a rule was triggered.

To address the problems of rule-based systems, machine learning (for example, deep neural networks) may be used to analyze system logs to detect and flag security events. However, a deep network architecture, unlike a rule-based approach, is essentially a black box. A security event is either flagged or not. There is no way to interpret or explain the output and the layers of decision-making. As noted, this poses issues for security analysts looking to resolve the underlying security issues in the computing environments.

Current IDS approaches create a trade-off between explainability and accuracy. A less accurate rules-based model may produce more false positives but will provide some context for why it detected a security event (for example, indicating which rule was triggered). A more complex machine learning model can provide far more accurate detection of security events but does so at the expense of explainability.

To address, among other things, the foregoing problems, systems and methods are provided herein for automatically detecting and scoring anomalies for a computing environment. Among other things, embodiments described herein provide a modified denoising diffusion probabilistic model (DDPM) to detect and score anomalies for one or more computing environments by analyzing network traffic events experienced by the computing environments. Embodiments presented herein use a DDPM modified to accept and process one-dimensional data using a multilayer perceptron to generate normalized losses for a network event using the reconstruction loss for the network event. The modified DDPM is trained using historical and non-anomalous network events for a computing environment. Noise (for example, Gaussian noise) is added to the network event data and the DDPM is taught how to remove the noise.

Embodiments presented herein analyze network events by adding noise to security data to be analyzed and providing the noised security data to the DDPM, which attempts to reconstruct the security data by removing the noise. The DDPM compares its ability to reconstruct the security data it has seen before to its ability to reconstruct the security data under analysis. The normalized loss indicates how anomalous the security data under analysis is compared to expected security data for the computing environment. Unlike current systems, which are trained to recognize particular types of security events, an IDS operating according to embodiments described herein is able to detect never before seen types of security events.

Some embodiments improve explainability by further processing security data using a simpler anomaly detection algorithm (for example, a Cluster-based Local Outlier Factor (CBLOF), a Histogram-based Outlier Scoring (HBOS) or a similar algorithm). For each feature of a set of security data under analysis, the algorithm determines the distance of the feature from a population mean or cluster. Using such embodiments, security events are detected and justification for the detection is provided.

Embodiments presented herein provide computing system anomaly detection systems with reduced false negative and positive indications, which in turn reduces the misuse of resources and leads to more efficient use of the monitored computing environment.

One example embodiment provides system for automatically detecting and scoring security anomalies in a computing environment. The system includes a communication interface, a memory, and an electronic processor communicatively coupled to the communication interface. The electronic processor is configured to retrieve, from the memory, executable instructions that, when executed by the electronic processor, cause the electronic processor to receive, via the communication interface, security data for the computing environment; parse the security data to extract a feature set representative of the security data; apply noise to the feature set to produce a noised feature set; produce a reduced noise feature set by processing the noised feature set using a neural network trained to remove noise; compare the reduced noise feature set to the feature set to determine a success score; select a threshold based on the security data; determine whether the success score exceeds the threshold; and, responsive to determining that the success score does not exceed the threshold, generate a security event based on the security data.

Another example embodiment provides a method for automatically detecting and scoring security anomalies in a computing environment. The method includes receiving security data for the computing environment. The method includes parsing, with an electronic processor, the security data to extract a feature set representative of the security data. The method includes applying, with the electronic processor, noise to the feature set to produce a noised feature set. The method includes producing a reduced noise feature set by processing, with the electronic processor, the noised feature set using a neural network trained to remove noise. The method includes comparing the reduced noise feature set to the feature set to determine a success score. The method includes selecting a threshold based on the security data. The method includes determining whether the success score exceeds the threshold. The method includes responsive to determining that the success score does not exceed the threshold, generate a security event based on the security data.

Another example embodiment provides a method for automatically detecting and scoring security anomalies in a computing environment. The method includes applying noise to a feature set for a network traffic event to produce a noised feature set. The method includes producing a reduced noise feature set by processing the noised feature set using a neural network trained to remove noise. The method includes comparing the reduced noise feature set to the feature set to determine a success score. The method includes determining whether the success score exceeds a threshold. The method includes responsive to determining that the success score does not exceed the threshold, labeling the network traffic event as anomalous.

As noted, embodiments of the present disclosure are directed to, among other things, methods and systems for automatically detecting and scoring anomalies relating to security by analyzing security data. Although many of the examples presented herein are described in terms of computing environments, the configurations disclosed herein can be implemented in a number of ways and in varying applications. More particularly, the techniques and systems described herein can be applied to a variety of computing environments that experience anomalies and that are capable of being monitored, for example, as a consequence of being run on platforms, devices, or networks that may be accessed and monitored or that may provide security data that may be accessed and analyzed according to the methods described herein.

Each of the above-mentioned embodiments will be discussed in more detail below, starting with example system and device architectures of the system in which the embodiments may be practiced, followed by an illustration of processing blocks for achieving an improved technical method, device, and system for reliable lockdown communication in wireless electronic locks.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, FIG. 1 illustrates an example system 100 for automatically detecting and scoring security anomalies in computing environments. The system 100 includes an anomaly detector 102, a database 104, and a console 106. The anomaly detector 102, database 104, the console 106, and other illustrated components are communicatively coupled via a communications network 108 to a computing environment 110. The communications network 108 may be implemented using wired or wireless communication components and may include various networks, for example, a wide area network, such as the Internet, a Long Term Evolution (LTE) network, a Global System for Mobile Communications (or Groupe Spécial Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, a local area network (for example a Wi-Fi™ network), and combinations or derivatives thereof.

Figure 2:
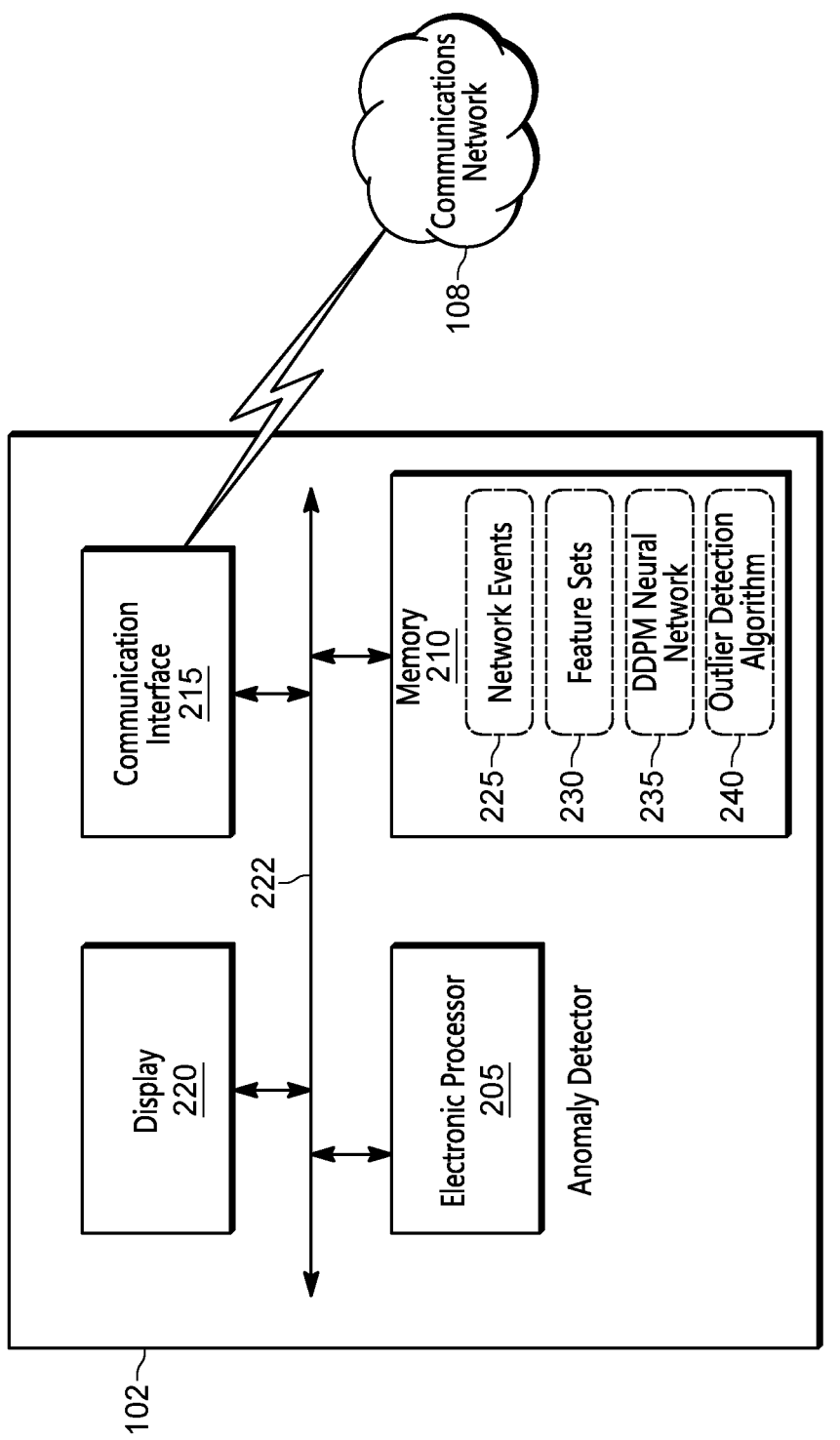
FIG. 2 schematically illustrates an anomaly detector included in the system of FIG. 1, according to some examples.

As described in detail herein, the anomaly detector 102, described more particularly with respect to FIG. 2, the database 104, and the console 106 electronically exchange commands and data (for example, via the communications network 108) and operate to automatically detect and score network security anomalies, for example, in the computing environment 110. In some embodiments, the system 100 is part of a security operations center (SOC) that, among other things, provides threat and intrusion detection services for the owners, operators, or users of the computing environment 110.

As illustrated in FIG. 1, to implement the methods described herein, the anomaly detector 102 may communicate with the database 104. The database 104 may be a database housed on a suitable database server communicatively coupled to and accessible by the anomaly detector 102. In alternative embodiments, the database 104 is part of a cloud-based database system external to the system 100 and accessible by the anomaly detector 102 over one or more networks. Also, in some embodiments, all or part of the database 104 is locally stored on the anomaly detector 102 (for example, within the memory 210).

In some embodiments, as illustrated in FIG. 1, the database 104 stores network traffic event data and incident data. Network traffic event data includes network data produced by network traffic events, as described herein. Network traffic event data may also include labels and other metadata assigned to network traffic events by the anomaly detector 102. Incident data includes data for documenting the reporting, analyzing, scoring, and resolution of network incidents. In some embodiments, the incident data is part of an SOC software suite. It should be understood that, in some embodiments, the data stored in the database 104 is distributed among multiple databases that communicate with the anomaly detector 102.

The console 106 is a computer terminal operated by an operator. In some embodiments, the console 106 is a terminal for a security operations center and is operated by systems analyst, engineer, or other technical personnel. In some embodiments, the console 106 is a computer that includes an electronic processor (for example, a microprocessor, or other electronic controller), a memory, a network interface, and other various modules coupled directly, by one or more control or data buses, or a combination thereof. The memory may include read-only memory, random access memory, other non-transitory computer-readable media, or a combination thereof. In one example, the electronic processor is configured to retrieve instructions and data from the memory and execute, for example, functions as described herein. The console 106 sends and receives data over the communications network 108 using the network interface. While the console 106 is described herein with reference to a single operator, in some embodiments, the console 106 includes a plurality of consoles 106 that are each operated by one or more operators.

The computing environment 110 operates to provide users (for example, the user 112) with the applications 114 and other computing services. In some embodiments, the computing environment 110 is operated for or by a public safety agency and may securely provide, for example, applications for communications, computer aided dispatch, incident management, crime analysis and investigation, video security and access control systems, records and evidence management, and the like. In some embodiments, the computing environment 110 is operated by an enterprise to provide various business-related software applications and services to hundreds or thousands of employees in a secure manner. In some embodiments, some of all of the computing environment 110 is operated for a contracting agency or enterprise by a service provider and contains dedicated software environments (for example, virtual servers), which are secured from one another and accessible only by their respective authorized groups of users. In some embodiments, the computing environment 110 may include multiple software environments for serving tens, hundreds, or thousands of users across multiple agencies, enterprises, or both. In some embodiments, the computing environment 110 includes components in multiple geographically distributed data centers.

The computing environment 110 includes client computing devices, which access one or more of the applications 114, which are provided by on one or more serving computing devices. Users (for example, the user 112) access the applications 114 (and other services of the computing environment 110) via client devices from within the computing environment 110, from outside the computing environment 110 (for example, using a VPN or other encrypted session), or both. Client computing devices include personal computers, portable communication devices (for example, a mobile phone or a tablet), or other electronic computing devices that can transmit and receive data to and from the computing environment 110. The computing environment 110 may interconnect its computing devices via many different types of networks, such as, for example, those described above with respect to the communications network 108, to facilitate communication between the devices of the computing environment 110.

As users (for example, the user 112) interact with the applications 114 and other devices and services of the computing environment 110, the interactions generate network traffic events. Similarly, automated interactions among and between the applications 114 and other computing devices within and without the computing environment 110 also generate network traffic events.

A network traffic event includes a packet or series of packets making up a network transaction or attempted transaction between two computing devices via a network of the computing environment 110. For example, a network traffic event may be a login session or and attempted login session between the user 112 and one of the applications 114. In another example, a network traffic event may be the transmission of a command (for example, a control command) or data to or from the user 112 and one of the applications 114. Network traffic events are characterized by a set of features, which may include a source address for the network traffic event, a destination address for the network traffic event, an application type for the network traffic event, a payload size for the network traffic event, and a timestamp for the network traffic event.

Most network traffic events present in the computing environment 110 are normal for the computing environment 110. By normal, it is meant that a network traffic event is authorized and expected (that is, produced by usual and legitimate activities of authorized users of the computing environment 110). However, some network traffic events may be anomalous in nature (for example, unauthorized traffic from a threat 116). An anomalous network event (also referred to herein as a "security event," an "anomaly" or a "network security anomaly") is one that is actually or potentially harmful to elements of the computing environment 110 (whether intentional or not). For example, an anomalous network traffic event may disable or deny or slow down access to applications or services; allow unauthorized access to otherwise secure applications, services, or data; destroys otherwise secure data; or otherwise degrade user experience, system performance, or both.

Examples of anomalous network events include malicious interference, hacking, computer worms or viruses, deliberate attempts to overload a system, broadcast attacks, or other internet attacks. Other examples include network events that are properly addressed and formatted (that is, according to the correct protocol), and may even be authenticated with valid security credentials, but nevertheless may be harmful. For example, some applications and systems may be compromised by the underlying data of the network traffic event, for example, using a "man-in-the-middle" attack.

As illustrated in FIG. 1, the computing environment 110 provides network traffic events (for example, as copies of network data, duplicate network streams, and the like) to the anomaly detector 102 for analysis as described herein. The anomaly detector 102 may send some network traffic events, for example, those labeled as anomalous, to the console 106 (for example, for display or further analysis).

The anomaly detector 102 is described more particularly with respect to FIG. 2. In the example provided, the anomaly detector 102 includes an electronic processor 205, a memory 210, a communication interface 215, and a display 220. The illustrated components, along with other various modules and components (not shown) are coupled to each other by or through one or more control or data buses (for example, a communication bus 222) that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the communication interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the methods described herein.

The memory 210 can include one or more non-transitory computer-readable media and includes a program storage area and a data storage area. The program storage area and the data storage area can include combinations of different types of memory, as described herein. In the embodiment illustrated, the memory 210 stores, among other things, data relating to network traffic events 225 and feature sets 230 (both described herein). The memory 210 also stores a denoising diffusion probabilistic model (DDPM) neural network 235 and an outlier detection algorithm 240 (both described herein).

The communication interface 215 is configured to receive input and to provide system output. The communication interface 215 obtains information and signals from, and provides information and signals to, (for example, over one or more wired and/or wireless connections) devices both internal and external to the anomaly detector 102. The communication interface 215 may include a wireless transmitter or transceiver for wirelessly communicating over the communications network 108.

Alternatively, or in addition to a wireless transmitter or transceiver, the communication interface 215 may include a port for receiving a cable, such as an Ethernet cable, for communicating over the communications network 108 or a dedicated wired connection. In some embodiments, the anomaly detector 102 communicates with other devices through one or more intermediary devices, such as routers, gateways, relays, and the like.

In the embodiment illustrated, the anomaly detector 102 includes a display 220, which is a suitable display such as, for example, a liquid crystal display (LCD) touch screen, or an organic light-emitting diode (OLED) touch screen. In some embodiments, the anomaly detector 102 implements a graphical user interface (GUI) (for example, generated by the electronic processor 205, from instructions and data stored in the memory 210, and presented on the display 220), that enables a user to interact with the anomaly detector 102. In some embodiments, the anomaly detector 102 enables display remotely, for example, using a display (configured similarly to the display 220) of the console 106.

As described more particularly herein, the anomaly detector 102 uses machine learning (in one example, the DDPM neural network 235 and the outlier detection algorithm 240) to analyze network traffic events to detect and score network security anomalies. Machine learning generally refers to the ability of a computer program to learn without being explicitly programmed. In some embodiments, a computer program (sometimes referred to as a learning engine) is configured to construct a model (for example, one or more algorithms) based on example inputs. Supervised learning involves presenting a computer program with example inputs and their desired (actual) outputs. The computer program is configured to learn a general rule (a model) that maps the inputs to the outputs in the training data. Machine learning may be performed using various types of methods and mechanisms. Example methods and mechanisms include decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using some or all of these approaches, a computer program may ingest, parse, and understand data and progressively refine models for data analytics, including image analytics. Once trained, the computer system may be referred to as an intelligent system, an artificial intelligence (AI) system, a cognitive system, or the like.

FIG. 3 illustrates an example method 300 for automatically detecting and scoring security anomalies in a computing environment. The method 300 is described as being performed by the system 100, and, in particular, the anomaly detector 102 and the electronic processor 205. However, it should be understood that in some embodiments, portions of the method 300 may be performed by other devices, including for example, the console 106. As an example, the method 300 is described in terms of the anomaly detector 102 operating to monitor the computing environment 110 for anomalies. However, it should be understood that embodiments of the method 300 may be used with multiple computing environments, arranged in various combinations. It should also be understood that embodiments of the method 300 may be used by embodiments of the system 100 that include more than one anomaly detector 102, database 104, or console 106.

At block 302, the electronic processor 205 receives (for example, via the communication interface 215) a network traffic event for the computing environment 110. In some embodiments, the computing environment 110 (that is, a device thereof) sends a continuous stream of network traffic events to the anomaly detector 102. In some embodiments, the computing environment 110 sends a representative sampling of network traffic events periodically. In some embodiments, the anomaly detector 102 includes or is in communication with a packet sniffer coupled to the computing environment and configured to gather network traffic events for analysis. In some embodiments, the computing environment 110 is configured to log network traffic events to the database 104 or another database accessible by the anomaly detector 102.

At block 304, the electronic processor 205 parses the network traffic event to extract a feature set describing the network traffic event. For example, the electronic processor 205 may decode packets for the network traffic event to extract values for the fields of the packets. Features are characteristics of the network traffic event, including for example, a source address for the network traffic event, a destination address for the network traffic event, an application type for the network traffic event, a payload size for the network traffic event, a payload type for the network traffic event, and a timestamp for the network traffic event.

At block 306, the electronic processor 205 applies noise to the feature set to produce a noised feature set. For example, the electronic processor 205 may corrupt or scramble some of the data in the feature set or add additional data to the feature set. In some embodiments, the electronic processor 205 applies noise to the feature set using a Gaussian distribution.

Figure 4:
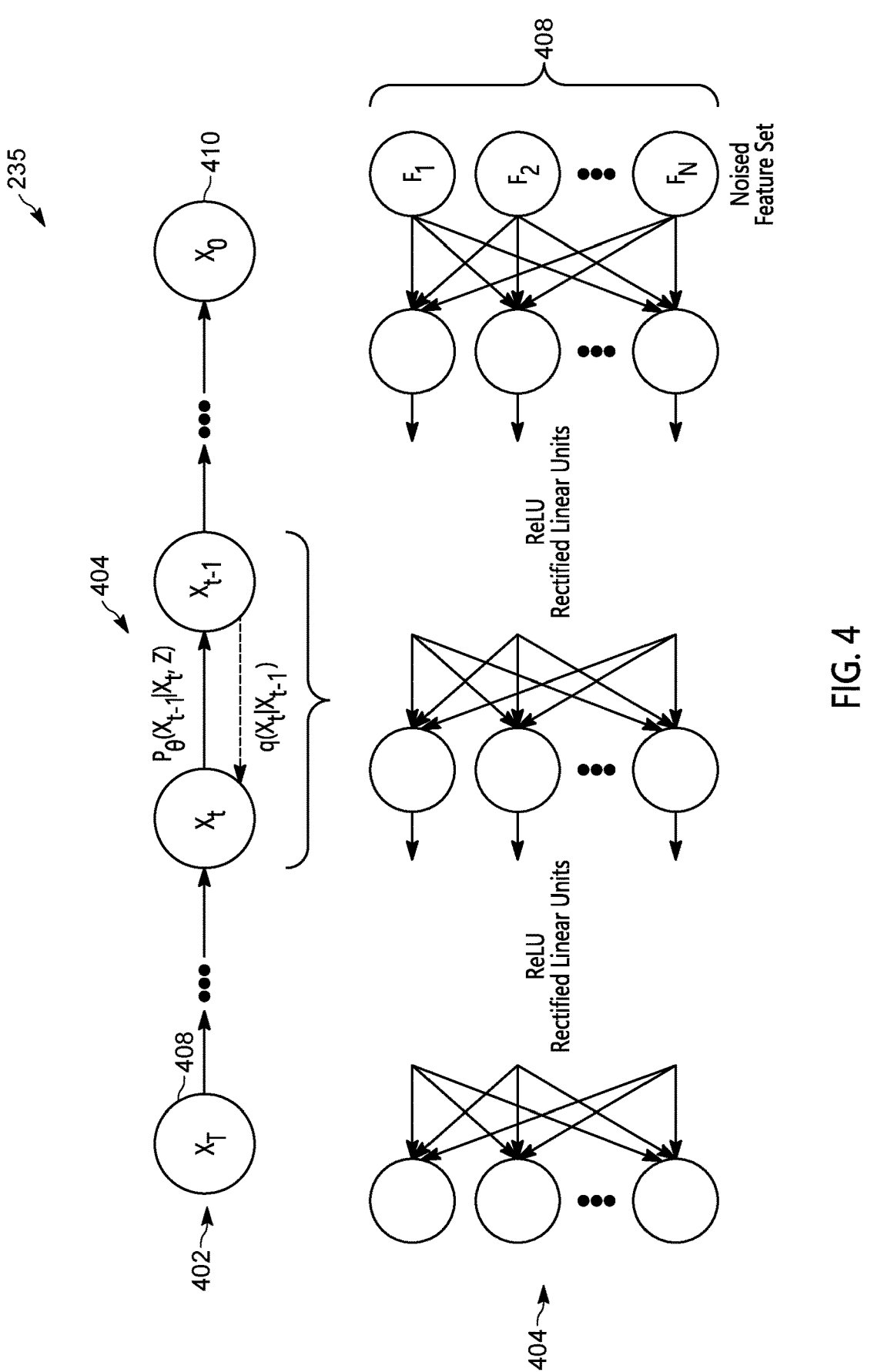
FIG. 4 illustrates aspects of the operation of a neural network executed by the system of FIG. 1, according to some examples.

At block 308, the electronic processor 205 produces a reduced noise feature set by processing the noised feature set using a neural network trained to remove noise from network traffic event data. In some embodiments, the electronic processor 205 uses the DDPM neural network 235 to produce the reduced noise feature set. As illustrated in FIG. 4, the DDPM neural network 235 is a neural network that includes a denoising diffusion probabilistic model 402.

Instead of the convolutional neural network typically found in DDPM implementations used for image detection (for example, the U-Net (a convolutional neural network created at the University of Freiburg)), the DDPM neural network 235 includes a multilayer perceptron 404. The initial input $X_T$ to the DDPM neural network 235 is the noised feature set 408 (generated at block 306). As illustrated in FIG. 4, the multilayer perceptron 404 is represented by the function $P_\theta(x_{t-1}|x_t, z)$ where $x_t$ is the current noised feature set being processed, $x_{t-1}$ is the result of the previous attempt by the DDPM to remove the noise, and z is the number of iterations being performed. The multilayer perceptron 404 includes rectified linear units (ReLU) between fully connected layers. The output 410 ($X_o$) is the result of the DDPM's attempt (after a number of iterations z) at removing the added noise to produce the original feature set (extracted at block 304).

Returning to FIG. 3, at block 310, the electronic processor 205 compares the reduced noise feature set to the feature set to determine a success score. The success score is a numeric value representing the measure of how successful the DDPM neural network 235 was at removing the noise from the noised feature set. In some embodiments, the success score is a percentage. More broadly, the success score may be viewed as an evaluation or assessment of how much noise is removed from the noised feature set. For example, when the DDPM neural network 235 removes all of the noise from the noised feature set (that is, the reduced noise feature set produced at block 308 is identical to the feature set extracted at block 304), the success score is 100%. As described herein, the neural network is trained to remove noise using network traffic events normal for the computing environment being monitored. If the success score is 100%, that indicates that the neural network has seen this type of network event before because it was part of the training data and it is therefore not a security threat. Accordingly, the lower the success score, the less likely it is that the neural network has seen this type of network event before, and the more likely it is that the network event is security threat.

As described above and illustrated in FIG. 5, in some embodiments, the electronic processor 205 performs multiple iterations of block 308 to successively remove noise. In some embodiments, the number of iterations is pre-determined and may be, for example, identical to the number of iterations used during the training of the neural network. In such embodiments, the result of the multiple iterations is used to determine the success score.

In some embodiments, the electronic processor 205 compares the reduced noise feature set to the feature set to determine a raw success score and normalizes the raw success score to determine the success score. For example, the electronic processor 205 may normalize the raw success score based on the results produced with the training data used to train the neural network. The normalized success score indicates how anomalous the network event under analysis is compared to expected network events for the computing environment.

At block 312, the electronic processor 205 determines whether the success score exceeds a threshold. The threshold is a numeric value representing an acceptable likelihood that the network traffic event under consideration represents normal network traffic for the computing environment and is therefore not anomalous (e.g., a security threat). For example, a threshold set at 80% would indicate that a network traffic event is not anomalous to the computing environment when the neural network is able to remove 80% of the noise form a noised feature set generated from that network traffic event.

At block 316, responsive to determining that the success score does not exceed the threshold (at block 314), the electronic processor 205 labels the network traffic event as anomalous. For example, the electronic processor 205 may store the network traffic event in a memory with an associated label indicating that it is an anomalous network traffic event for the computing environment that generated it. In some embodiments, the electronic processor 205, responsive to determining that the success score does not exceed the threshold, performs a mitigation action. For example, the electronic processor 205 may generate an incident management system log entry by making an entry in the database 104. In another example, the electronic processor 205 may transmit an electronic message (for example, using an API or a suitable electronic protocol) to an analyst (for example, an SOC analyst). In another example, the electronic processor 205 may transmit an electronic configuration command based on the feature set to a network device. For example, the electronic processor 205 may instruct a firewall or other security device to block network packets matching certain features in the feature set for the anomalous network event (for example, blocking packets from the source address). In another example, the electronic processor 205 may display an alert on a graphical user interface (for example, presented on the display 220 or a display of the console 106.

Figure 5:
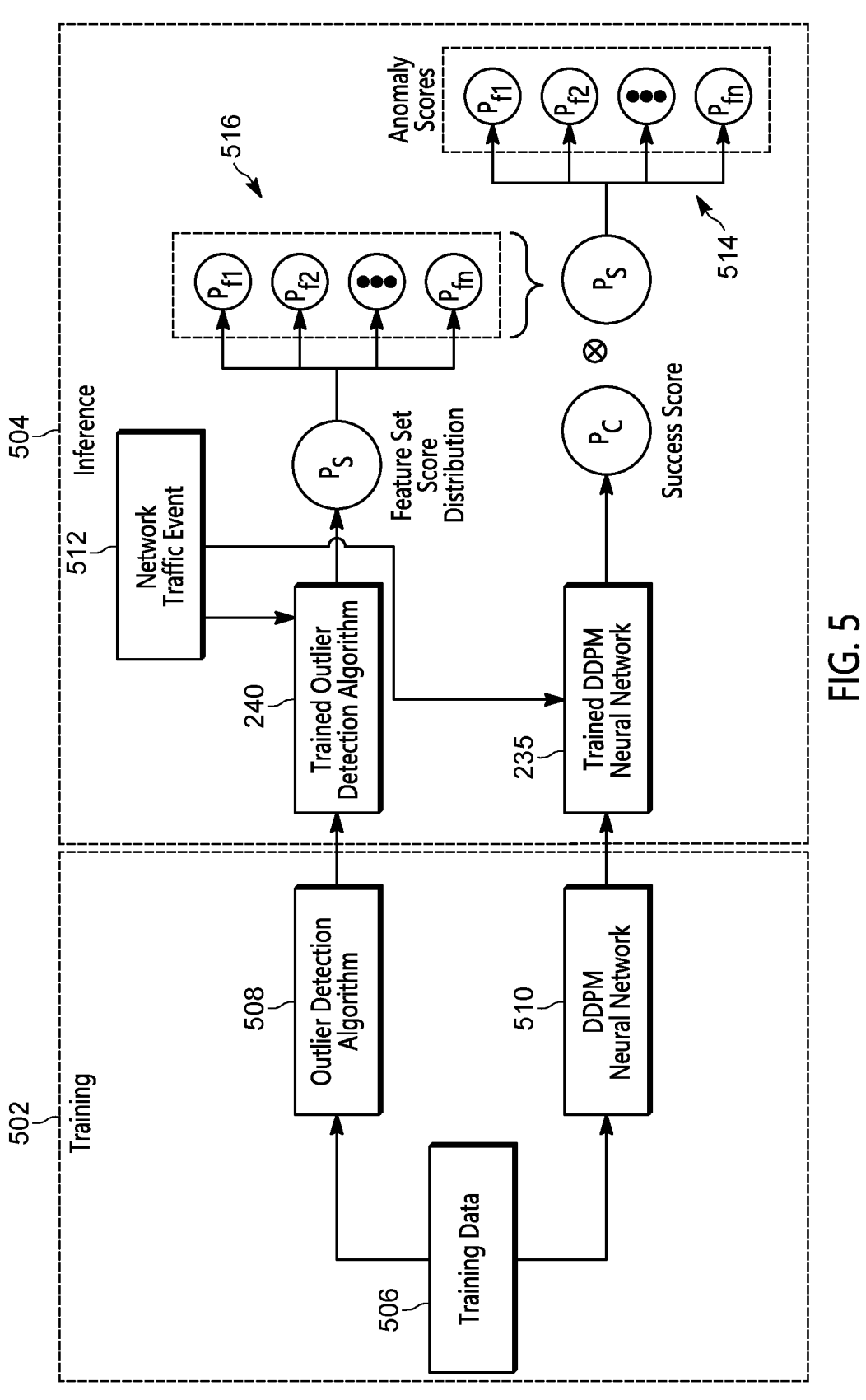
FIG. 5 is a block diagram illustrating aspects of the operation of the system of FIG. 1, according to some examples.

In some embodiments, responsive to determining that the success score does not exceed the threshold (at block 312), the electronic processor 205 further analyzes the feature set with an outlier detection algorithm. For example, as illustrated in FIG. 5, during a training phase 502 (described in part with respect to FIG. 6), training data 506 is used to train both an initial untrained DDPM neural network 510 (to produce the trained DDPM neural network 235 illustrated in FIG. 4 and described herein) and an untrained outlier detection algorithm 508 (to produce the outlier detection algorithm 240). The outlier detection algorithm may be, for example, a Cluster-based Local Outlier Factor (CBLOF), a Histogram-based Outlier Scoring (HBOS), or a similar algorithm.

As illustrated in FIG. 5, in some embodiments, during the inference phase 504, the trained outlier detection algorithm 240 and the DDPM neural network 235 are used in conjunction to detect and score network security anomalies. In the example illustrated, a network traffic event 512 is being analyzed. If, for example, the electronic processor 205 determines that the success score for the feature set extracted from the network traffic event 512 does not exceed the threshold (at block 314), then it analyzes the noiseless originally extracted feature set with the outlier detection algorithm 240 to generate a plurality of anomaly scores 514. As illustrated in FIG. 5, the outlier detection algorithm 240 processes the feature set to produce a feature set score distribution 516. For each feature of the feature set, the outlier detection algorithm 240 determines the distance of the feature from a population mean or cluster. The feature set distribution is combined with the success score to produce a set of anomaly scores, each associated with an individual feature of the feature set. The anomaly scores provide a breakdown of how anomalous each feature of the network traffic event is. The electronic processor 205 labels the network traffic event as anomalous based on the plurality of anomaly scores. This labeling provides SOC analysts a starting point for their investigation of the network security event.

Returning to FIG. 3, in some embodiments, when the electronic processor 205 determines that the success score exceeds the threshold (at block 314), the method 300 continues (at block 302) to analyze additional network traffic events.

As noted, the DDPM neural network is trained to remove noise. FIG. 6 illustrates an example method 600 for training the neural network to remove noise. The method 600 is described as being performed by the system 100, and, in particular, the anomaly detector 102 and the electronic processor 205. However, it should be understood that in some embodiments, portions or all of the method 600 may be performed by other devices.

At block 602, the method 600 begins training with a plurality of expected network traffic events representing a distribution of traffic for the network. For example, the plurality of expected network traffic events may be a historical network log, scrubbed of any anomalous network traffic events (for example, using a rules-based approach). In another example, the plurality of expected network traffic events may be curated by one or more SOC analysts to represent a desired distribution of traffic for the network. In any case, the plurality of expected network traffic events is used as training data for the neural network because it represents non-anomalous network traffic.

At block 604, the electronic processor 205 parses the first expected network traffic event of the plurality of expected network traffic events to extract an expected feature set describing the expected network traffic event, for example, as described above with respect to block 304 of FIG. 3.

At block 606, the electronic processor 205 applies a noise value to the expected feature set to produce a noised expected feature set, for example, as described above with respect to block 306 of FIG. 3.

At block 608, the electronic processor 205 produces a reduced noise expected feature set by processing the noised expected feature set using the multilayer perceptron (for example, as illustrated in FIG. 4). During this step, the electronic processor 205 attempts to remove the noise applied at block 606.

At block 610, the electronic processor 205 compares the reduced noise expected feature set to the expected feature set to determine a reconstruction loss. The reconstruction loss is a numeric value indicative of the neural network's success at removing the noise, similar to the success score described above with respect to FIG. 3. The higher the success, the lower the reconstruction loss.

In some embodiments, the electronic processor 205 iterates (e.g., repeats) blocks 604-610, performing a quantity of successive passes for each expected network event. For each successive pass, the noise value for the added noise is higher than the noise value of the previous pass. In so doing, the neural network progressively improves its ability to remove noise from the expected network traffic event.

At block 612, when there are remaining expected network events to process, the method 600 continues processing the plurality of expected network traffic events (at block 604).

At block 612, when there are no remaining expected network events to process, the method 600 ends at block 614.

Figure 7:
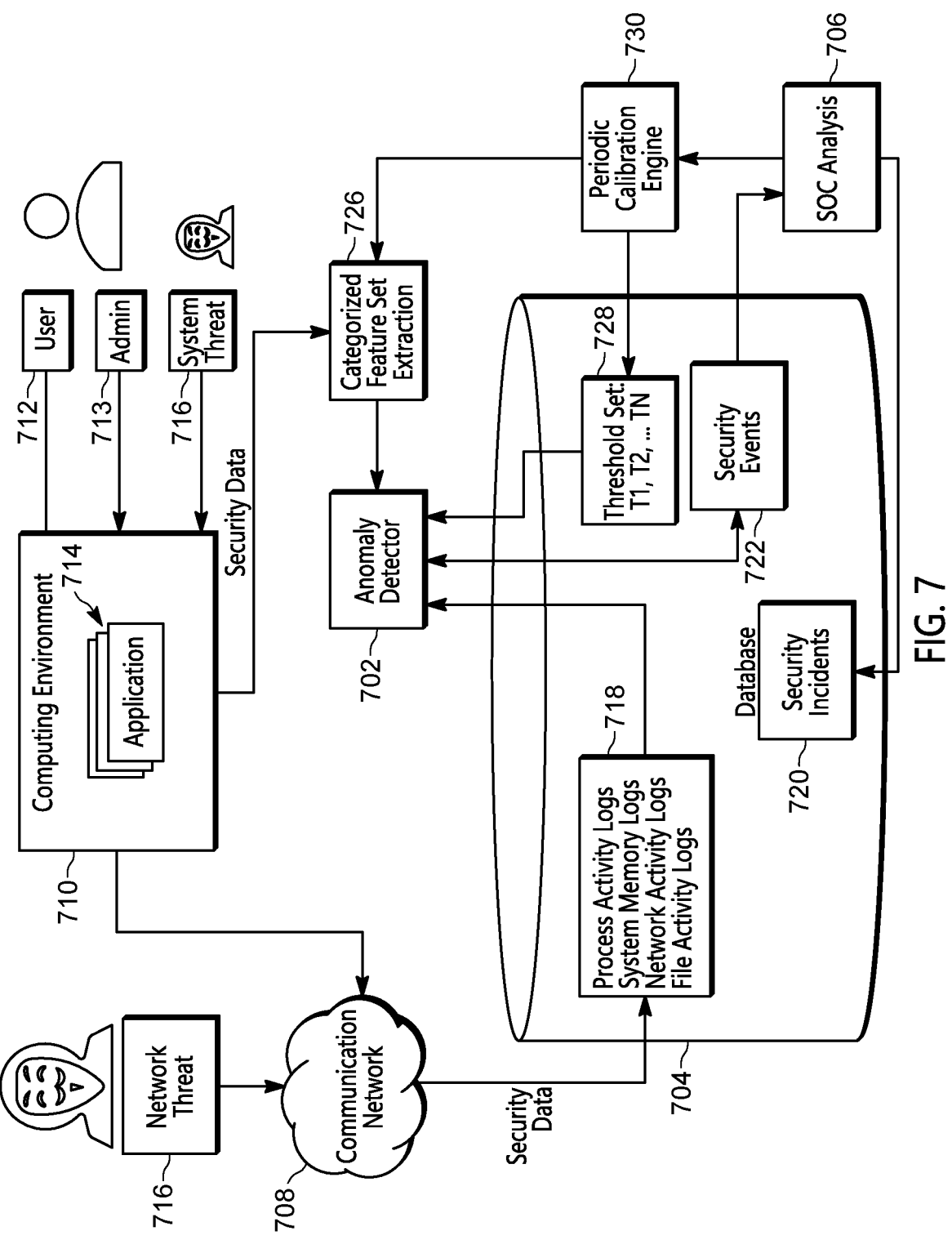
FIG. 7 is a block diagram of an anomaly detection system for a computing environment, according to some examples.

Security threats to computing environments are not limited to network events. Other aspects of a computing environment (e.g., processes, systems, memory, and the like) may be affected by malicious attacks or otherwise harmful factors. FIG. 7 illustrates an example system 700 for automatically detecting and scoring other network and other types of security anomalies in computing environments by analyzing multiple aspects of the computing environments.

The system 700 includes, among other things, an anomaly detector 702 and a database 704. The anomaly detector 702, database 704, and other illustrated components are communicatively coupled via a communications network 708 to a computing environment 110. The communications network 708 may be implemented and operate similarly to the communications network 108, as described herein.

Figure 8:
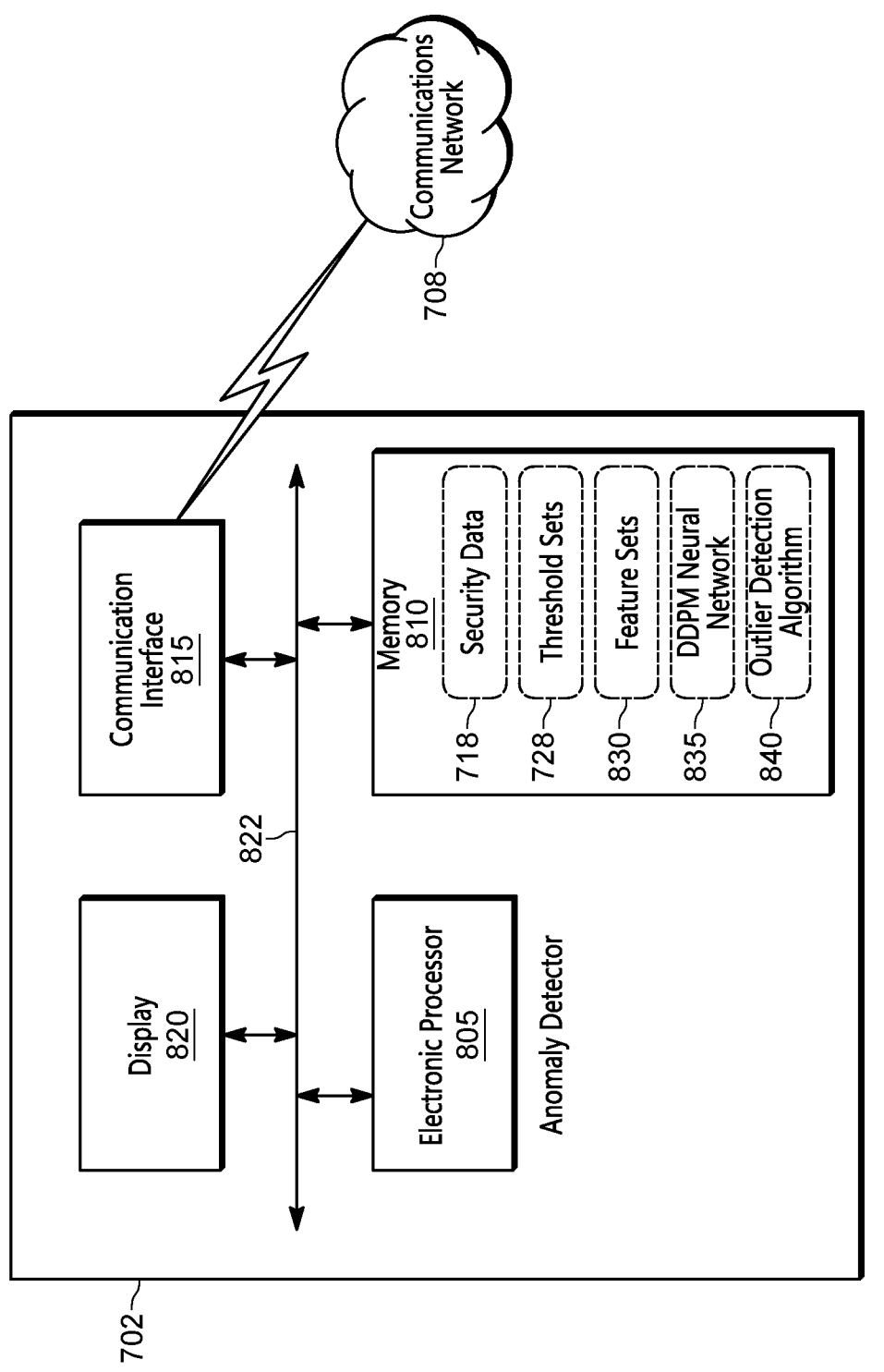
FIG. 8 schematically illustrates an anomaly detector included in the system of FIG. 7, according to some examples.

As described in detail herein, the anomaly detector 702, described more particularly with respect to FIG. 8, the database 704, and other components of the system 700 electronically exchange commands and data (for example, via the communications network 708) and operate to automatically detect and score network security anomalies, for example, in the computing environment 710. In some embodiments, the system 700 is part of a security operations center (SOC) that, among other things, provides threat and intrusion detection services for the owners, operators, or users of the computing environment 710.

As illustrated in FIG. 7, to implement the methods described herein, the anomaly detector 702 may communicate with the database 704. The database 704 may be a database housed on a suitable database server communicatively coupled to and accessible by the anomaly detector 702. In alternative embodiments, the database 704 is part of a cloud-based database system external to the system 700 and accessible by the anomaly detector 702 over one or more networks. Also, in some embodiments, all or part of the database 704 is locally stored on the anomaly detector 702 (for example, within the memory 810).

In some embodiments, as illustrated in FIG. 7, the database 704 stores security data 718, security incidents 720, security events 722, and threshold sets 728, all of which of described in detail below. It should be understood that, in some embodiments, the data stored in the database 704 is distributed among multiple databases that communicate with the anomaly detector 702.

Information, including security incidents and security events, may be sent to and from the database 704 and a console 706. In some aspects, the console 706 is a computer terminal (including, for example, an electronic processor, a memory, and a network interface configured to execute functions as described herein) for a security operations center (SOC) and is operated by systems analyst, engineer, or other technical personnel. While the console 706 is described herein with reference to a single operator, in some embodiments, the console 706 includes a plurality of consoles 706 that are each operated by one or more operators.

The computing environment 710 operates to provide users (for example, the user 112, the administrative user 713, or both) with the applications 714 and other computing services. In some embodiments, the computing environment 710 is operated for or by public safety agencies, enterprises, and the like, as described herein with respect to the system 100. In some embodiments, the computing environment 710 may include multiple software environments for serving tens, hundreds, or thousands of users across multiple agencies, enterprises, or both. In some embodiments, the computing environment 710 includes components in multiple geographically distributed data centers.

The computing environment 710 includes client computing devices, which access one or more of the applications 714, which are provided by on one or more serving computing devices. Users (for example, the user 712, the administrative user 713, or both) access the applications 714 (and other services of the computing environment 710) via client devices from within the computing environment 710, from outside the computing environment 710 (for example, using a VPN or other encrypted session), or both. Client computing devices include personal computers, portable communication devices (for example, a mobile phone or a tablet), or other electronic computing devices that can transmit and receive data to and from the computing environment 710. The computing environment 710 may interconnect its computing devices via many different types of networks to facilitate communication between the devices of the computing environment 710.

As illustrated in FIG. 7, security data 718 for the computing environment 710 is stored in the database 704. Security data 718 is generated by the devices and software (e.g., operating systems and the applications 714) of the computing environment 710 as they operate. Security data 718 is also generated as users (for example, the user 712) interact with the computing environment 710. Similarly, automated interactions among and between the applications 714 and other computing devices within and without the computing environment 710 also generate security data. As illustrated in FIG. 7, security data 718 may include process activity logs, system memory logs, network activity logs, and file activity logs. These logs may include, among other things, data points representing requests received by applications, dependencies (calls to external services), traces (for example, diagnostic logging), events, performance metrics, and the like. The security data also 718 also includes data points representing exceptions, for example, errors associated with one or more operations of the operating systems and software applications hosted by the computing environment 710. In some embodiments, the computing environment 710 provides the security data to the database 704 using, for example, a unified logging service (ULS). Security data 718 may include network traffic events, as described herein with respect to the system 100.

Security data may indicate normal operations of the computing environment 710. By normal, it is meant that a security data represents operations and conditions that are authorized and expected (that is, produced by the hardware and softer of the computing environment 710 operating within expected norms, as well as usual and legitimate activities of authorized users of the computing environment 710). However, security data may also indicate operations or conditions that are anomalous in nature. Some anomalies may be indicative of security events 722. A security event occurs when one or more conditions or activities that are harmful to elements of the computing environment 710 (whether intentional or not). For example, a security event may disable, deny, or slow down access to applications or services; allow unauthorized access to otherwise secure applications, services, or data; destroy or corrupt data; or otherwise degrade user experience, system performance, or both. Security events may be both external (for example, a system threat 716 may attempt to breach the computing environment 710 or the communication network 708) or internal to the computing environment 710.

As illustrated in FIG. 7, the computing environment 710 provides security data to the database 704, where it is stored and accessed by the anomaly detector 702 for analysis as described herein. The anomaly detector 702 sends security events to the console 706 (for example, for display or further analysis). In some aspects, SOC analysis is performed (e.g., at the console 706) to validate a security event, reclassify it as a security incident 720, and/or calibrate aspects of the anomaly detection process, as described herein.

As described more particularly with respect to FIG. 9, feature set extraction is performed based on the security data to provide feature sets to the anomaly detector 702, which it uses in its analysis. The feature sets are provided by a categorized feature set extraction process 726, which may be performed in software by the anomaly detector 702 or another computing device included in or provided separately from the system 700.

The anomaly detector 702 also uses threshold sets 728 to make its determinations. As illustrated in FIG. 7, and described herein, the threshold sets 728 and feature set extraction 726 may be calibrated by a periodic calibration engine 730, based on analysis from the console 706, or another source.

The periodic calibration engine 730 may include one or more machine learning models and may be performed in software by the anomaly detector 702 or another computing device included in or provided separately from the system 700. As described herein, the periodic calibration engine 730 updates the thresholds and tunes the feature set extraction 726 based on the state of the computing environment 710 over time (e.g., as indicated through feedback received from the console 706 and other sources).

The anomaly detector 702 is described more particularly with respect to FIG. 8. In the example provided, the anomaly detector 702 includes an electronic processor 805, a memory 810, a communication interface 815, and a display 820. The illustrated components, along with other various modules and components (not shown) are coupled to each other by or through one or more control or data buses (for example, a communication bus 822) that enable communication therebetween. The use of control and data buses for the interconnection between and exchange of information among the various modules and components would be apparent to a person skilled in the art in view of the description provided herein.

The electronic processor 805 obtains and provides information (for example, from the memory 810 and/or the communication interface 815), and processes the information by executing one or more software instructions or modules, capable of being stored, for example, in a random access memory ("RAM") area of the memory 810 or a read only memory ("ROM") of the memory 810 or another non-transitory computer readable medium (not shown). The software can include firmware, one or more applications, program data, filters, rules, one or more program modules, and other executable instructions. The electronic processor 805 is configured to retrieve from the memory 810 and execute, among other things, software related to the methods described herein.

The memory 810 can include one or more non-transitory computer-readable media and includes a program storage area and a data storage area. The program storage area and the data storage area can include combinations of different types of memory, as described herein. In the embodiment illustrated, the memory 810 stores, among other things, security data 718, threshold sets 728, and feature sets 830 (as described herein). The memory 810 also stores a trained denoising diffusion probabilistic model (DDPM) neural network 835 and a trained outlier detection algorithm 840 (as described herein).

The communication interface 815 and display 820 are configured and operate similarly to the communication interface 215 and display 220, respectively, as described herein with respect to FIG. 2. In some embodiments, the anomaly detector 702 enables display remotely, for example, using a display (configured similarly to the display 820) of the console 706.

As described more particularly herein, the anomaly detector 702 uses machine learning (in one example, the trained DDPM neural network 835 and the trained outlier detection algorithm 840) to analyze security data to detect and score network security anomalies.

FIG. 9 illustrates an example method 900 for automatically detecting and scoring security anomalies in a computing environment. The method 900 is described as being performed by the system 700, and, in particular, the anomaly detector 702 and the electronic processor 805. However, it should be understood that in some embodiments, portions of the method 900 may be performed by other devices, including for example, the console 706 and the periodic calibration engine 730. As an example, the method 900 is described in terms of the anomaly detector 702 operating to monitor the computing environment 710 for anomalies. However, it should be understood that embodiments of the method 900 may be used with multiple computing environments, arranged in various combinations. It should also be understood that embodiments of the method 900 may be used by embodiments of the system 700 that include more than one anomaly detector 702, database 704, or console 706.

At block 902, the electronic processor 805 receives (for example, via the communication interface 815) security data for the computing environment 710. In some embodiments, the computing environment 710 (e.g., via the database 704) sends a continuous stream of security data to the anomaly detector 702. In some embodiments, anomaly detector 702 queries the database 704 to obtain security data. In some instances, the security data is received as part of a periodic automated monitoring routine. In some instances, the security data is received in response to a query (e.g., an ad hoc analysis of a particular device or application based on a user inquiry). In other instances, the anomaly detector 702 may be configured to receive and continuously analyze security data or to randomly receive/retrieve samples of security data for analysis.

At block 904, the electronic processor 805 parses the security data to extract a feature set representative of the security data. A feature set represents a set of particular data points, which will be extracted from the security data and analyzed as a group. For example, the electronic processor 805 may determine a category for the security data and extract a feature set representative of the security data based on the category. Examples of categories include, process activity, memory activity, file activity, and network activity. In some instances, the category is specified by a request to analyze a particular set of the security data (e.g., made as part of a regular monitoring routine or in response to a trouble ticket). For example, a complaint of slow file access times may be investigated by requesting security data related to network activity and file activity. In other instances, the anomaly detector 702 may determine a category for the security data based on the quantity and type of security data received.

Process activity includes security data relating to the execution of processes (e.g., software daemons, applications, and the like) within the computing environment 710. A feature set for process activity may include a process name (e.g., to detect unusual process names or names that mimic legitimate system processes), a CPU usage level (e.g., to detect unusually high or sustained CPU usage by a process), a memory usage level (e.g., to detect unusually high or sustained memory usage by a process), a network activity level (e.g., to detect unusual levels of network activity associated with a process, such as a large amount of data being sent or received), a process parentage (e.g., to detect processes that are not spawned from a parent process that typically spawns such processes), a file access pattern (e.g., to detect processes that access files in unusual ways or locations), and a timestamp.

Memory activity includes security data relating to the allocation and use of memory within the computing environment 710. A feature set for memory activity may include an allocation (e.g., to detect a sudden, large, or unusual allocation of memory), an access pattern (e.g., to detect unusual or suspicious patterns of memory access, such as accessing protected memory areas or using memory in ways that typical applications do not), a process location (e.g., to detect processes running from locations in memory, from which they typically do not run), an injected code (e.g., to detect evidence of code injection, where a process modifies the code of another running process), and a timestamp.

File activity includes security data relating to files and file systems used by the computing environment 710. A feature set for file activity may include a filename extension (e.g., to detect unexpected changes in file extensions, a common sign of files being encrypted by ransomware), a size change (e.g., to detect sudden and significant changes in file size, which may indicate that a file has been encrypted or modified), an access pattern (e.g., to detect unusual patterns of file access, such as a large number of files being accessed in a short period of time), a modification pattern (e.g., to detect to detect unusual patterns of file modification, such as a large number of files being modified in a short period of time), a location (e.g., to detect files appearing in locations where they typically do not, or files disappearing from their usual locations), metadata (e.g., to detect changes in file metadata, such as creation, modification, or access times, that do not align with typical user or system activity), an entropy change (e.g., to detect unexpected changes in randomness of files), and a timestamp.

Network activity includes security data relating to network communications to, from, and within the computing environment 710 (e.g., related to "network events" as described herein). A feature set for network activity may include a source address, a destination address, an application type, a payload size, a payload type, a network layer, and a timestamp.

The extracted feature set may include some or all of the features for the particular category.

At block 906, the electronic processor 805 applies noise to the feature set to produce a noised feature set, as described above with respect to block 306 of the method 300.

At block 908, the electronic processor 805 produces a reduced noise feature set by processing the noised feature set using a neural network trained to remove noise from security data, as described above with respect to block 308 of the method 300.

At block 912, the electronic processor 805 selects a threshold based on the security data. Different categories of security data (e.g., process, memory, file, and network) have different thresholds that indicate anomalous activity. In some instances, the threshold is a numeric value representing an acceptable likelihood that the security data under consideration represents normal security data for the computing environment and is therefore not anomalous. For example, a threshold set at 80% would indicate that the security data in question is not anomalous to the computing environment (e.g., does not represent a security event) when the neural network is able to remove 80% of the noise form a noised feature set generated from that security data. The threshold values may vary depending on the type of security data being analyzed. Accordingly, the threshold is selected from among the threshold set 728 based on the security data under analysis (e.g., based on the extracted feature set).

At block 914, the electronic processor 805 compares the reduced noise feature set to the feature set to determine a success score. The success score is a numeric value representing the measure of how successful the trained DDPM neural network 835 was at removing the noise from the noised feature set. In some embodiments, the success score is a percentage. More broadly, the success score may be viewed as an evaluation or assessment of how much noise is removed from the noised feature set. For example, when the trained DDPM neural network 835 removes all of the noise from the noised feature set (that is, the reduced noise feature set produced at block 908 is identical to the feature set extracted at block 904), the success score is 100%. As described herein, the neural network is trained to remove noise using security data normal for the computing environment being monitored. If the success score is 100%, that indicates that the neural network has seen this type of security data before because it was part of the training data and it is therefore not likely indicative of a security event. Accordingly, the lower the success score, the less likely it is that the neural network has seen this type of security data before, and the more likely it is that the security data represents a security event.

In some aspects, the electronic processor 805 performs multiple iterations of block 908 to successively remove noise. In some embodiments, the number of iterations is pre-determined and may be, for example, identical to the number of iterations used during the training of the neural network. In such embodiments, the result of the multiple iterations is used to determine the success score.

In some embodiments, the electronic processor 805 compares the reduced noise feature set to the feature set to determine a raw success score and normalizes the raw success score to determine the success score. For example, the electronic processor 805 may normalize the raw success score based on the results produced with the training data used to train the neural network. The normalized success score indicates how anomalous the security data under analysis is compared to expected security data for the computing environment.

At block 914, the electronic processor 205 determines whether the success score exceeds the threshold (selected at block 912). At block 918, responsive to determining that the success score does not exceed the threshold (at block 916), the electronic processor 805 generates a security event based on security data. A security event may take the form of a trouble ticket or other database entry, which includes the extracted feature set and an indication of the success score. In some embodiments, the anomaly detector may further classify the security event (e.g., as a process security event, a memory security event, a file security event, or a network security event).

In some instances, the electronic processor 805 may store the security event in the database 704 and transmit an alert regarding the security event to the console 706. For example, the electronic processor 805 may generate an incident management system log entry for the security event by making an entry in the database 704. In another example, the electronic processor 805 may transmit an electronic message (for example, using an API or a suitable electronic protocol) to an analyst (for example, an SOC analyst).

In some cases, an SOC analyst may analyze the security event and determine that the anomaly detector 702 produced a false positive result. In such cases, the analyst either downgrades the security event to a security incident, or invalidates the determination entirely (i.e., classifies the security data as normal or not anomalous). In other cases, the SOC analyst verifies the determination of a security event and begins work on mitigating the security event. The various actions taken by the SOC analyst to validate the security event are sent to the periodic calibration engine 730, which, along with the security event data (e.g., the extracted feature set, the success score, and the threshold) form a validation report for the security event. The periodic calibration engine 730 is configured to analyze the validation reports to adjust the thresholds and feature set extraction to improve detection of security events. For example, the periodic calibration engine 730 may include a machine learning model trained with a set of security data sets and corresponding feature sets, thresholds, and security event determinations. The periodic calibration engine 730 may adjust thresholds or the makeup of feature sets to reduce the occurrence of false positives and false negatives over time.

In some embodiments, the periodic calibration engine 730 is configured to adjust feature sets, thresholds, or both based on the dynamic nature of the computing environment 710. For example, when a backup routine is running, thresholds for file activity may need to be adjusted to account for the increased amount of file access. In another example, thresholds may be adjusted based on how busy the environment is expected to be. For example, thresholds may be adjusted to account for increased usage leading up to a holiday or decreased usage on a holiday. The periodic calibration engine 730 may be configured to adjust feature set extraction in a similar manner.

Figure 10:
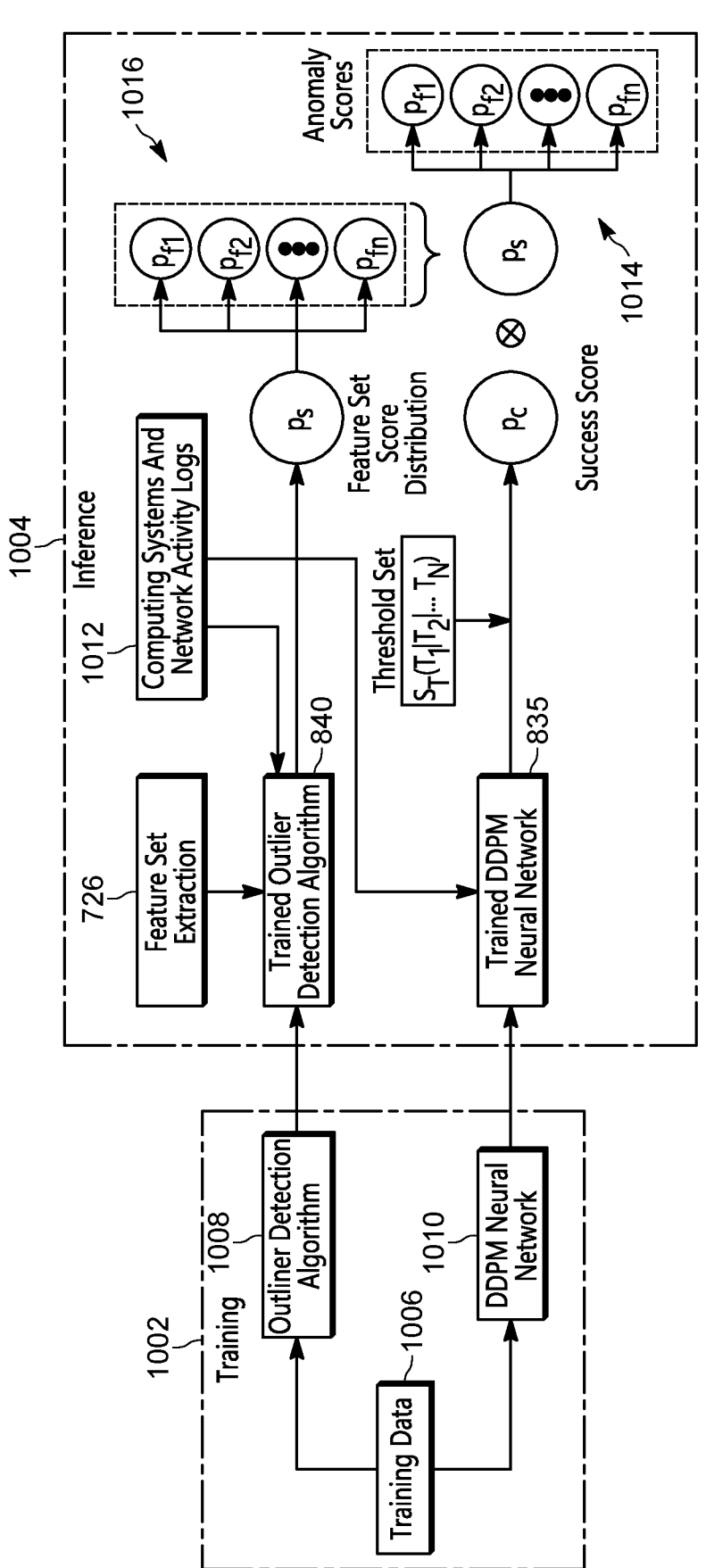
FIG. 10 is a block diagram illustrating aspects of the operation of the system of FIG. 7, according to some examples.

In some embodiments, responsive to determining that the success score does not exceed the threshold (at block 914), the electronic processor 805 further analyzes the extracted feature set with an outlier detection algorithm. For example, as illustrated in FIG. 10, during a training phase 1002 (described in part with respect to FIG. 11), training data 1006 is used to train both an initial untrained DDPM neural network 1010 (to produce the trained DDPM neural network 835 illustrated in FIG. 8 and described herein) and an untrained outlier detection algorithm 1008 (to produce the trained outlier detection algorithm 840). The outlier detection algorithm may be, for example, a Cluster-based Local Outlier Factor (CBLOF), a Histogram-based Outlier Scoring (HBOS), or a similar algorithm.

As illustrated in FIG. 10, in some embodiments, during the inference phase 1004, the trained outlier detection algorithm 840 and the trained DDPM neural network 835 are used in conjunction to detect and score security events. In the example illustrated, security data 1012 (e.g., computing system and network activity logs) is being analyzed. If, for example, the electronic processor 805 determines that the success score for the feature set extracted from the security data 1012 does not exceed the threshold (at block 914), then it analyzes the noiseless originally extracted feature set with the trained outlier detection algorithm 840 to generate a plurality of anomaly scores 1014. As illustrated in FIG. 5, the trained outlier detection algorithm 840 processes the feature set to produce a feature set score distribution 1016. As described herein, the feature set differs based on the security data being analyzed. For each feature of the feature set, the trained outlier detection algorithm 840 determines the distance of the feature from a population mean or cluster. The feature set distribution is combined with the success score to produce a set of anomaly scores, each associated with an individual feature of the feature set. The anomaly scores provide a breakdown of how anomalous each feature of the security data is. The electronic processor 805 determines that the security data represents a security event based on the plurality of anomaly scores. This provides SOC analysts a starting point for their investigation of the security event.

Returning to FIG. 9, in some embodiments, when the electronic processor 805 determines that the success score exceeds the threshold (at block 916), the method 900 continues (at block 902) to analyze additional security data.

Figure 11:
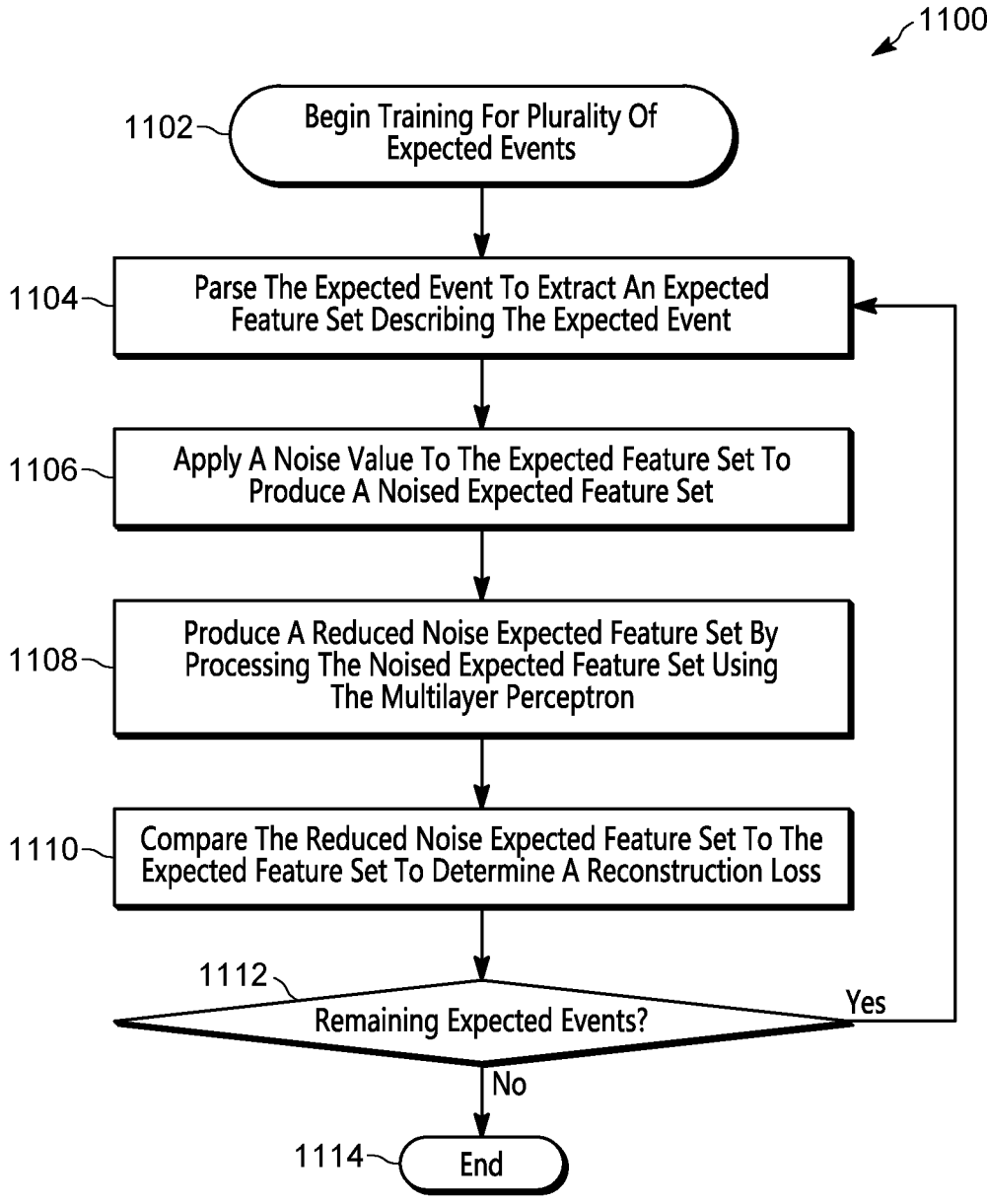
FIG. 11 is a flowchart of a method for training a neural network executed by the system of FIG. 7, according to some examples.

As noted, the trained DDPM neural network 835 is trained to remove noise. FIG. 11 illustrates an example method 1100 for training the neural network to remove noise. The method 1100 is described as being performed by the system 700, and, in particular, the anomaly detector 702 and the electronic processor 805. However, it should be understood that in some embodiments, portions or all of the method 1100 may be performed by other devices.

At block 1102, the method 1100 begins training with a plurality of expected events. An expected event is a set of security data for the computing environment 710. The plurality of expected events represents a distribution of security data that represents a nominal operating state for the computing environment 710. For example, the plurality of expected events may be taken from historical computing system and network logs, scrubbed of any anomalous security events (for example, using a rules-based approach). In another example, the plurality of expected events may be curated by one or more SOC analysts to represent a normal operating condition for the computing environment 710. In any case, the plurality of expected events is used as training data for the neural network because it represents non-anomalous security data.

At block 1104, the electronic processor 805 parses the first expected event of the plurality of expected events to extract an expected feature set describing the expected event, for example, as described above with respect to block 904 of FIG. 9.

At block 1106, the electronic processor 805 applies a noise value to the expected feature set to produce a noised expected feature set, for example, as described above with respect to block 906 of FIG. 9.

At block 1108, the electronic processor 805 produces a reduced noise expected feature set by processing the noised expected feature set using the multilayer perceptron (for example, as illustrated in FIG. 4). During this step, the electronic processor 805 attempts to remove the noise applied at block 1106.

At block 1110, the electronic processor 805 compares the reduced noise expected feature set to the expected feature set to determine a reconstruction loss. The reconstruction loss is a numeric value indicative of the neural network's success at removing the noise, similar to the success score described above with respect to FIG. 9. The higher the success, the lower the reconstruction loss.

In some embodiments, the electronic processor 805 iterates (e.g., repeats) blocks 1104-1110, performing a quantity of successive passes for each expected event. For each successive pass, the noise value for the added noise is higher than the noise value of the previous pass. In so doing, the neural network progressively improves its ability to remove noise from the expected event.

At block 1112, when there are remaining expected events to process, the method 1100 continues processing the plurality of expected events (at block 1104).

At block 1112, when there are no remaining expected events to process, the method 1100 ends at block 1114.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, and cannot remove noise from data, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "they"" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field program-mable gate arrays (FPGAs) and unique stored program instructions (including both software and firmware) that control the one or more processors to implement, in con-junction with certain non-processor circuits, some, most, or all of the functions of the method and/or apparatus described herein. Alternatively, some or all functions could be imple-mented by a state machine that has no stored program instructions, or in one or more application specific integrated circuits (ASICs), in which each function or some combina-tions of certain of the functions are implemented as custom logic. Of course, a combination of the two approaches could be used.

Moreover, an embodiment can be implemented as a computer-readable storage medium having computer read-able code stored thereon for programming a computer (e.g., comprising a processor) to perform a method as described and claimed herein. Any suitable computer-usable or com-puter readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in con-nection with the instruction execution system, apparatus, or device.

Further, it is expected that one of ordinary skill, notwith-standing possibly significant effort and many design choices motivated by, for example, available time, current technol-ogy, and economic considerations, when guided by the concepts and principles disclosed herein will be readily capable of generating such software instructions and pro-grams and ICs with minimal experimentation. For example, computer program code for carrying out operations of various example embodiments may be written in an object-oriented programming language such as Java, Smalltalk, C++, Python, or the like. However, the computer program code for carrying out operations of various example embodi-ments may also be written in conventional procedural pro-gramming languages, such as the "C" programming lan-guage or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Inter-net Service Provider).

The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way but may also be configured in ways that are not listed.

The terms "coupled," "coupling," or "connected" as used herein can have several different meanings depending on the context in which these terms are used. For example, the terms coupled, coupling, or connected can have a mechani-cal or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The following paragraphs provide various examples of the embodiments disclosed herein.

Example 1. A system for detecting security anomalies in a computing environment, the system including: a commu-nication interface; an electronic processor communicatively coupled to the communication interface and configured to: receive, via the communication interface, a network traffic event for the computing environment; parse the network traffic event to extract a feature set describing the network traffic event; apply noise to the feature set to produce a noised feature set; produce a reduced noise feature set by processing the noised feature set using a neural network trained to remove noise; compare the reduced noise feature set to the feature set to determine a success score; determine whether the success score exceeds a threshold; and respon-sive to determining that the success score does not exceed the threshold, label the network traffic event as anomalous.

Example 2. The system of Example 1, wherein the elec-tronic processor is configured to: produce a second reduced noise feature set by processing the reduced noised feature set using the neural network trained to remove noise; determine the success score by comparing the second reduced noise feature set to the feature set.

Example 3. The system of Example 1, wherein the elec-tronic processor is configured to: compare the reduced noise feature set to the feature set to determine a raw success score; and normalize the raw success score to determine the success score.

Example 4. The system of Example 1, wherein the neural network includes a denoising diffusion probabilistic model including a multilayer perceptron.

Example 5. The system of Example 4, wherein the elec-tronic processor is configured to train the neural network to remove noise by, for each of a plurality of expected network traffic events representing a distribution of traffic for the network: (a) parsing the expected network traffic event to extract an expected feature set describing the expected network traffic event; (b) applying a noise value to the expected feature set to produce a noised expected feature set; (c) producing a reduced noise expected feature set by processing the noised expected feature set using the multi-layer perceptron; and (d) comparing the reduced noise expected feature set to the expected feature set to determine a reconstruction loss.

Example 6. The system of Example 5, wherein the elec-tronic processor is configured to, for each of a plurality of expected network traffic events: repeat steps (a)-(d) for a quantity of passes, wherein for each pass of the quantity of passes, the noise value is higher than the noise value of the previous pass.

Example 7. The system of Example 1, wherein the electronic processor is configured to, responsive to determining that the success score does not exceed the threshold, analyze the feature set with an outlier detection algorithm to generate a plurality of anomaly scores, each of the anomaly scores associated with an individual feature of the feature set; and label the network traffic event as anomalous based on the plurality of anomaly scores.

Example 8. The system of Example 1, wherein the feature set includes at least one selected from the group consisting of a source address for the network traffic event, a destination address for the network traffic event, an application type for the network traffic event, a payload size for the network traffic event, a payload type for the network traffic event, and a timestamp for the network traffic event.

Example 9. The system of Example 1, wherein the electronic processor is configured to, responsive to determining that the success score does not exceed the threshold, perform a mitigation action including at least one selected from the group consisting of generating an incident management system log entry, transmitting an electronic message to an analyst, transmitting an electronic configuration command based on the feature set to a network device, and displaying an alert on a graphical user interface.

Example 10. The system of Example 1, wherein the electronic processor is configured to apply noise to the feature set using a Gaussian distribution.

Example 11. A method for detecting and scoring security anomalies in a computing environment, the method including: receiving a network traffic event for the computing environment; parsing, with an electronic processor, the network traffic event to extract a feature set describing the network traffic event; applying, with the electronic processor, noise to the feature set to produce a noised feature set; producing a reduced noise feature set by processing the noised feature set using a neural network trained to remove noise; comparing, with the electronic processor, the reduced noise feature set to the feature set to determine a success score; determining whether the success score exceeds a threshold; and responsive to determining that the success score does not exceed the threshold, labeling the network traffic event as anomalous.

Example 12. The method of Example 11, further comprising: producing a second reduced noise feature set by processing the reduced noised feature set using the neural network trained to remove noise; determine the success score by comparing the second reduced noise feature set to the feature set.

Example 13. The method of Example 11, further comprising: comparing the reduced noise feature set to the feature set to determine a raw success score; and normalizing the raw success score to determine the success score.

Example 14. The method of Example 11, wherein producing the reduced noise feature set includes processing the noised feature set using a denoising diffusion probabilistic model including a multilayer perceptron.

Example 15. The method of Example 14, further comprising: training the neural network to remove noise by, for each of a plurality of expected network traffic events representing a distribution of traffic for the network: (a) parsing the expected network traffic event to extract an expected feature set describing the expected network traffic event; (b) applying a noise value to the expected feature set to produce a noised expected feature set; (c) producing a reduced noise expected feature set by processing the noised expected feature set using the multilayer perceptron; and (d) comparing the reduced noise expected feature set to the expected feature set to determine a reconstruction loss.

Example 16. The method of Example 15, further comprising: for each of a plurality of expected network traffic events: repeating steps (a)-(d) for a quantity of passes, wherein for each pass of the quantity of passes, the noise value is higher than the noise value of the previous pass.

Example 17. The method of Example 11, further comprising: responsive to determining that the success score does not exceed the threshold: analyzing the feature set with an outlier detection algorithm to generate a plurality of anomaly scores, each of the anomaly scores associated with an individual feature of the feature set; and labeling the network traffic event as anomalous based on the plurality of anomaly scores.

Example 18. The method of Example 11, wherein extracting the feature set includes extracting at least one selected from the group consisting of a source address for the network traffic event, a destination address for the network traffic event, an application type for the network traffic event, a payload size for the network traffic event, a payload type for the network traffic event, and a timestamp for the network traffic event.

Example 19. The method of Example 11, further comprising: responsive to determining that the success score does not exceed the threshold, performing a mitigation action including at least one selected from the group consisting of generating an incident management system log entry, transmitting an electronic message to an analyst, transmitting an electronic configuration command based on the feature set to a network device, and displaying an alert on a graphical user interface.

Example 20. The method of Example 11, further comprising: applying noise to the feature set using a Gaussian distribution.

Example 21. A system for detecting security anomalies in a computing environment, the system including: a communication interface; a memory; and an electronic processor communicatively coupled to the communication interface; wherein the electronic processor is configured to retrieve, from the memory, executable instructions that, when executed by the electronic processor, cause the electronic processor to: receive, via the communication interface, security data for the computing environment; parse the security data to extract a feature set representative of the security data; apply noise to the feature set to produce a noised feature set; produce a reduced noise feature set by processing the noised feature set using a neural network trained to remove noise; compare the reduced noise feature set to the feature set to determine a success score; select a threshold based on the security data; determine whether the success score exceeds the threshold; and responsive to determining that the success score does not exceed the threshold, generate a security event based on the security data.

Example 22. The system of Example 21, wherein the executable instructions further cause the electronic processor to: determine a category for the security data; extract the feature set representative of the security data based on the category; and select the threshold based on the category.

Example 23. The system of Example 22, wherein the executable instructions further cause the electronic processor to: receive, with a calibration engine, a validation report for the security event; and determine, with the calibration engine, an adjusted threshold for the category based on the validation report.

Example 24. The system of Example 23, wherein the executable instructions further cause the electronic processor to: determine, with the calibration engine, an adjusted feature set for the category based on the validation report.

Example 25. The system of Example 22, wherein the category is one selected from a group consisting of network activity, process activity, memory activity, and file activity.

Example 26. The system of Example 22, wherein the category is network activity, and the feature set includes at least one selected from a group consisting of a source address, a destination address, an application type, a payload size, a payload type, a network layer, and a timestamp.

Example 27. The system of Example 22, wherein the category is process activity, and the feature set includes at least one selected from a group consisting of a process name, a CPU usage level, a memory usage level, a network activity level, a process parentage, a file access pattern, and a timestamp.

Example 28. The system of Example 22, wherein the category is memory activity, and the feature set includes at least one selected from a group consisting of an allocation, an access pattern, a process location, injected code, and a timestamp.

Example 29. The system of Example 22, wherein the category is file activity, and the feature set includes at least one selected from a group consisting of a filename extension, a size change, an access pattern, a modification pattern, a location, metadata, an entropy change, and a timestamp.

Example 30. The system of Example 21, wherein the executable instructions further cause the electronic processor to: compare the reduced noise feature set to the feature set to determine a raw success score; and normalize the raw success score to determine the success score.

Example 31. The system of Example 21, wherein the executable instructions further cause the electronic processor to: responsive to determining that the success score does not exceed the threshold, analyze the feature set with an outlier detection algorithm to generate a plurality of anomaly scores, each of the anomaly scores associated with an individual feature of the feature set; and label the security data as anomalous based on the plurality of anomaly scores.

Example 32. The system of Example 21, wherein the neural network includes a denoising diffusion probabilistic model including a multilayer perceptron.

Example 33. The system of Example 32, wherein the electronic processor is configured to train the neural network to remove noise by, for a plurality of expected events representing a nominal operating state for the computing environment: (a) parsing the expected event to extract an expected feature set describing the expected event; (b) applying a noise value to the expected feature set to produce a noised expected feature set; (c) producing a reduced noise expected feature set by processing the noised expected feature set using the multilayer perceptron; and (d) comparing the reduced noise expected feature set to the expected feature set to determine a reconstruction loss.

Example 34. The system of Example 33, wherein the electronic processor is configured to, for each of the plurality of expected events: repeat steps (a)-(d) for a quantity of passes, wherein for each pass of the quantity of passes, the noise value is higher than the noise value of the previous pass.

Example 35. A method for detecting and scoring security anomalies in a computing environment, the method including: receiving security data for the computing environment; parsing, with an electronic processor, the security data to extract a feature set representative of the security data;

applying, with the electronic processor, noise to the feature set to produce a noised feature set; producing a reduced noise feature set by processing, with the electronic processor, the noised feature set using a neural network trained to remove noise; comparing the reduced noise feature set to the feature set to determine a success score; selecting a threshold based on the security data; determining whether the success score exceeds the threshold; and responsive to determining that the success score does not exceed the threshold, generate a security event based on the security data.

Example 36. The method of Example 35, further comprising: determining a category for the security data; wherein extracting the feature set representative of the security data includes extracting the feature set representative of the security data based on the category; and selecting the threshold includes selecting the threshold based on the category.

Example 37. The method of Example 36, further comprising: receiving, with a calibration engine, a validation report for the security event; and determining, with the calibration engine, an adjusted threshold for the category based on the validation report.

Example 38. The method of Example 37, further comprising: determining, with the calibration engine, an adjusted feature set for the category based on the validation report.

Example 39. The method of Example 36, wherein the category is one selected from a group consisting of network activity, process activity, memory activity, and file activity.

Example 40. A method for detecting and scoring security anomalies in a computing environment, the method comprising: applying noise to a feature set for a network traffic event to produce a noised feature set; producing a reduced noise feature set by processing the noised feature set using a neural network trained to remove noise; comparing the reduced noise feature set to the feature set to determine a success score; determining whether the success score exceeds a threshold; and responsive to determining that the success score does not exceed the threshold, labeling the network traffic event as anomalous.

We claim:

1. A system for detecting security anomalies in a computing environment, the system including:
   a communication interface;
   a memory; and
   an electronic processor communicatively coupled to the communication interface;
   wherein the electronic processor is configured to retrieve, from the memory, executable instructions that, when executed by the electronic processor, cause the electronic processor to:
   receive, via the communication interface, security data for the computing environment;
   parse the security data to extract a feature set representative of the security data;
   apply noise to the feature set to produce a noised feature set;
   produce a reduced noise feature set by processing the noised feature set using a neural network trained to remove noise;
   compare the reduced noise feature set to the feature set to determine a success score;
   select a threshold based on the security data;
   determine whether the success score exceeds the threshold; and responsive to determining that the success score does not exceed the threshold, generate a security event based on the security data.

2. The system of claim 1, wherein the executable instructions further cause the electronic processor to:

determine a category for the security data;

extract the feature set representative of the security data based on the category; and select the threshold based on the category.

3. The system of claim 2, wherein the executable instructions further cause the electronic processor to:

receive, with a calibration engine, a validation report for the security event; and determine, with the calibration engine, an adjusted threshold for the category based on the validation report.

4. The system of claim 3, wherein the executable instructions further cause the electronic processor to:

determine, with the calibration engine, an adjusted feature set for the category based on the validation report.

5. The system of claim 2, wherein the category is one selected from a group consisting of network activity, process activity, memory activity, and file activity.

6. The system of claim 2, wherein the category is network activity and the feature set includes at least one selected from a group consisting of a source address, a destination address, an application type, a payload size, a payload type, a network layer, and a timestamp.

7. The system of claim 2, wherein the category is process activity and the feature set includes at least one selected from a group consisting of a process name, a CPU usage level, a memory usage level, a network activity level, a process parentage, a file access pattern, and a timestamp.

8. The system of claim 2, wherein the category is memory activity and the feature set includes at least one selected from a group consisting of an allocation, an access pattern, a process location, injected code, and a timestamp.

9. The system of claim 2, wherein the category is file activity and the feature set includes at least one selected from a group consisting of a filename extension, a size change, an access pattern, a modification pattern, a location, metadata, an entropy change, and a timestamp.

10. The system of claim 1, wherein the executable instructions further cause the electronic processor to:

compare the reduced noise feature set to the feature set to determine a raw success score; and normalize the raw success score to determine the success score.

11. The system of claim 1, wherein the executable instructions further cause the electronic processor to:

responsive to determining that the success score does not exceed the threshold, analyze the feature set with an outlier detection algorithm to generate a plurality of anomaly scores, each of the anomaly scores associated with an individual feature of the feature set; and label the security data as anomalous based on the plurality of anomaly scores.

12. The system of claim 1, wherein the neural network includes a denoising diffusion probabilistic model including a multilayer perceptron.

13. The system of claim 12, wherein the electronic processor is configured to train the neural network to remove noise by, for each of a plurality of expected events representing a nominal operating state for the computing environment:

(a) parsing the expected event to extract an expected feature set describing the expected event;

(b) applying a noise value to the expected feature set to produce a noised expected feature set;

(c) producing a reduced noise expected feature set by processing the noised expected feature set using the multilayer perceptron; and (d) comparing the reduced noise expected feature set to the expected feature set to determine a reconstruction loss.

14. The system of claim 13, wherein the electronic processor is configured to, for each of the plurality of expected events:

repeat steps (a)-(d) for a quantity of passes, wherein for each pass of the quantity of passes, the noise value is higher than the noise value of a previous pass.

15. A method for detecting and scoring security anomalies in a computing environment, the method including:

receiving security data for the computing environment;

parsing, with an electronic processor, the security data to extract a feature set representative of the security data;

applying, with the electronic processor, noise to the feature set to produce a noised feature set;

producing a reduced noise feature set by processing, with the electronic processor, the noised feature set using a neural network trained to remove noise;

comparing the reduced noise feature set to the feature set to determine a success score;

selecting a threshold based on the security data;

determining whether the success score exceeds the threshold; and responsive to determining that the success score does not exceed the threshold, generate a security event based on the security data.

16. The method of claim 15, further comprising:

determining a category for the security data;

wherein extracting the feature set representative of the security data includes extracting the feature set representative of the security data based on the category; and selecting the threshold includes selecting the threshold based on the category.

17. The method of claim 16, further comprising:

receiving, with a calibration engine, a validation report for the security event; and determining, with the calibration engine, an adjusted threshold for the category based on the validation report.

18. The method of claim 17, further comprising:

determining, with the calibration engine, an adjusted feature set for the category based on the validation report.

19. The method of claim 16, wherein the category is one selected from a group consisting of network activity, process activity, memory activity, and file activity.

20. A method for detecting and scoring security anomalies in a computing environment, the method comprising:

applying noise to a feature set for a network traffic event to produce a noised feature set;

producing a reduced noise feature set by processing the noised feature set using a neural network trained to remove noise;

comparing the reduced noise feature set to the feature set to determine a success score;

determining whether the success score exceeds a threshold; and responsive to determining that the success score does not exceed the threshold, labeling the network traffic event as anomalous.

* * * * *